(12) United States Patent
Kuhns et al.

(10) Patent No.: US 7,948,380 B2
(45) Date of Patent: May 24, 2011

(54) SPATIALLY DISTRIBUTED REMOTE SENSOR

(75) Inventors: David W. Kuhns, Monrovia, CA (US); M. Benton Free, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 785 days.

(21) Appl. No.: 11/383,652

(22) Filed: Sep. 6, 2006

(65) Prior Publication Data

US 2008/0061965 A1    Mar. 13, 2008

(51) Int. Cl.
*G08B 13/14* (2006.01)

(52) U.S. Cl. ............... 340/572.1; 340/572.2; 340/572.5; 340/572.7; 340/568.1; 340/444; 340/447; 340/448; 340/568.2; 340/605; 340/606; 600/300; 600/398; 600/405

(58) Field of Classification Search ............... 340/572.1, 340/572.2, 572.5, 572.7, 568.1, 568.2, 604, 340/605, 444, 447, 448; 600/300, 398, 405
See application file for complete search history.

(56) References Cited

U.S. PATENT DOCUMENTS

| | | | |
|---|---|---|---|
| 4,520,885 A | 6/1985 | Jeffrey | |
| 4,658,153 A | 4/1987 | Brosh et al. | |
| 5,181,423 A | 1/1993 | Philipps et al. | |
| 5,504,425 A | 4/1996 | Fericean et al. | |
| 5,608,739 A | 3/1997 | Snodgrass et al. | |
| 5,973,598 A | 10/1999 | Beigel | |
| 6,025,725 A | 2/2000 | Gershenfeld et al. | |
| 6,184,755 B1 | 2/2001 | Barber et al. | |
| 6,201,980 B1 | 3/2001 | Darrow et al. | |
| 6,236,220 B1 | 5/2001 | Enguent | |
| 6,359,444 B1 | 3/2002 | Grimes | |
| 6,362,738 B1 | 3/2002 | Vega | |
| 6,380,894 B1 * | 4/2002 | Boyd et al. | 342/450 |
| 6,388,255 B1 * | 5/2002 | Di Maio et al. | 250/338.2 |
| 6,574,166 B2 | 6/2003 | Niemiec | |
| 6,603,403 B2 * | 8/2003 | Jeutter et al. | 340/604 |
| 6,630,887 B2 | 10/2003 | Lake | |
| 6,720,866 B1 * | 4/2004 | Sorrells et al. | 340/10.4 |
| 6,753,783 B2 | 6/2004 | Friedman et al. | |
| 6,774,800 B2 | 8/2004 | Friedman et al. | |
| 6,939,299 B1 * | 9/2005 | Petersen et al. | 600/398 |
| 7,038,470 B1 | 5/2006 | Johnson | |

(Continued)

FOREIGN PATENT DOCUMENTS

WO     WO 00/58752     10/2000

(Continued)

OTHER PUBLICATIONS

Suh, W. D., "Design Optimization and Experimental Verification of a Wireless IDT Based Micro Temperature Sensor", *Smart.Mater. Struct.* 9 (2000), pp. 890-897.

(Continued)

*Primary Examiner* — Tai T Nguyen
(74) *Attorney, Agent, or Firm* — Kristofor L. Storvick

(57) ABSTRACT

A remote sensing device includes a plurality of components arranged to form a resonant electrical circuit. The plurality of components includes at least one sensing component having sensing elements distributed among regions of an area of interest. The sensing elements are arranged so that a resonant characteristic of the resonant circuit is modifiable by an external event affecting an element associated with a region. The sensing component may be a capacitor having spatially distributed capacitive elements or an inductor having spatially distributed inductive elements.

2 Claims, 18 Drawing Sheets

U.S. PATENT DOCUMENTS

| | | | |
|---|---|---|---|
| 7,397,353 B2 * | 7/2008 | Myhre et al. ................. 340/448 |
| 7,456,744 B2 | 11/2008 | Kuhns et al. |
| 7,498,802 B2 | 3/2009 | Takahata |
| 2001/0016683 A1 | 8/2001 | Darrow et al. |
| 2002/0145525 A1 | 10/2002 | Friedman et al. |
| 2002/0175182 A1 | 11/2002 | Matthews |
| 2003/0163287 A1 | 8/2003 | Vock et al. |
| 2004/0089058 A1 | 5/2004 | De Haan et al. |
| 2004/0090298 A1 | 5/2004 | Masu et al. |
| 2005/0141591 A1 | 6/2005 | Sakano |
| 2005/0223841 A1 | 10/2005 | Lee |
| 2005/0249037 A1 | 11/2005 | Kohn |
| 2005/0273014 A1 | 12/2005 | Gianchandani et al. |
| 2006/0025897 A1 | 2/2006 | Shostak et al. |
| 2006/0049947 A1 | 3/2006 | Foster |
| 2007/0018810 A1 | 1/2007 | Smythe et al. |
| 2007/0027371 A1 | 2/2007 | Benaron et al. |
| 2007/0135803 A1 | 6/2007 | Belson |
| 2007/0208542 A1 | 9/2007 | Vock et al. |
| 2007/0232958 A1 | 10/2007 | Donofrio et al. |
| 2007/0238992 A1 | 10/2007 | Donofrio et al. |
| 2007/0249901 A1 | 10/2007 | Ohline et al. |
| 2008/0018424 A1 | 1/2008 | Takahata |

FOREIGN PATENT DOCUMENTS

| | | |
|---|---|---|
| WO | WO 01/18535 A2 | 3/2001 |
| WO | WO 03/044521 A1 | 5/2003 |
| WO | WO 2004/015624 | 2/2004 |
| WO | WO 2004/078787 A1 | 9/2004 |
| WO | WO 2005/059859 A1 | 6/2005 |
| WO | WO 2006/010108 | 2/2006 |

OTHER PUBLICATIONS

Arndt, et al., "Poly(vinyl alcohol)/poly(acrylic acid) hydrogels: FT-IR spectroscopic characterization of crosslinking reaction and work at transition point", Acta Polym. (1999) 50, pp. 383-390.

Baldi, et al, "A Self-Resonant Frequency-Modulated Micromachined Passive Pressure Transensor", IEEE Sensors Journal, vol. 3, No. 6, (Dec. 2003) pp. 728-733.

Gerlach, et al., "Chemical and pH sensors based on the swelling behavior of hyrdogels", Sensors and Actuators B 111-112 (2005) pp. 555-561.

Herber, et al., "Exploitation of a pH-sensitive hydrogel disk for CO2 detection", Sensors and Actuators B 103 (2004) pp. 284-289.

Lei, et al., "A Hydrogel-based Wireless Chemical Sensor", IEEE (2004) pp. 391-394.

Oshiro, et al., "A Novel Miniature Planar Inductor", IEEE Transactions of Magnetics, vol. Mag-23, No. 5 (Sep. 1987) pp. 3759-3761.

Strong, et al., Hydrogel-Actuated Capacitive Transducer for Wireless Biosensors, Biomedical Microdevices 4:2 (2002) pp. 97-103.

Velten, et al., "Micro-coil with movable core for application in an inductive displacement sensor", J. Micromech. Microeng. 9 (1999) pp. 119-122.

Yokoyama, et al., "On-Chip Variable Inductor Using Microelectromechanical Systems Technology", Jpn. J. Appl. Phys., 42 (2003) pp. 2190-2192.

Zine-El-Abidine, et al., "Tunable Radio Frequency MEMS Inductors with Thermal Bimorph Actuators", J. Micromech. Microeng. 15 (2005) pp. 2063-2068.

EP Search Report dated Nov. 11, 2010, 6 pages.

* cited by examiner

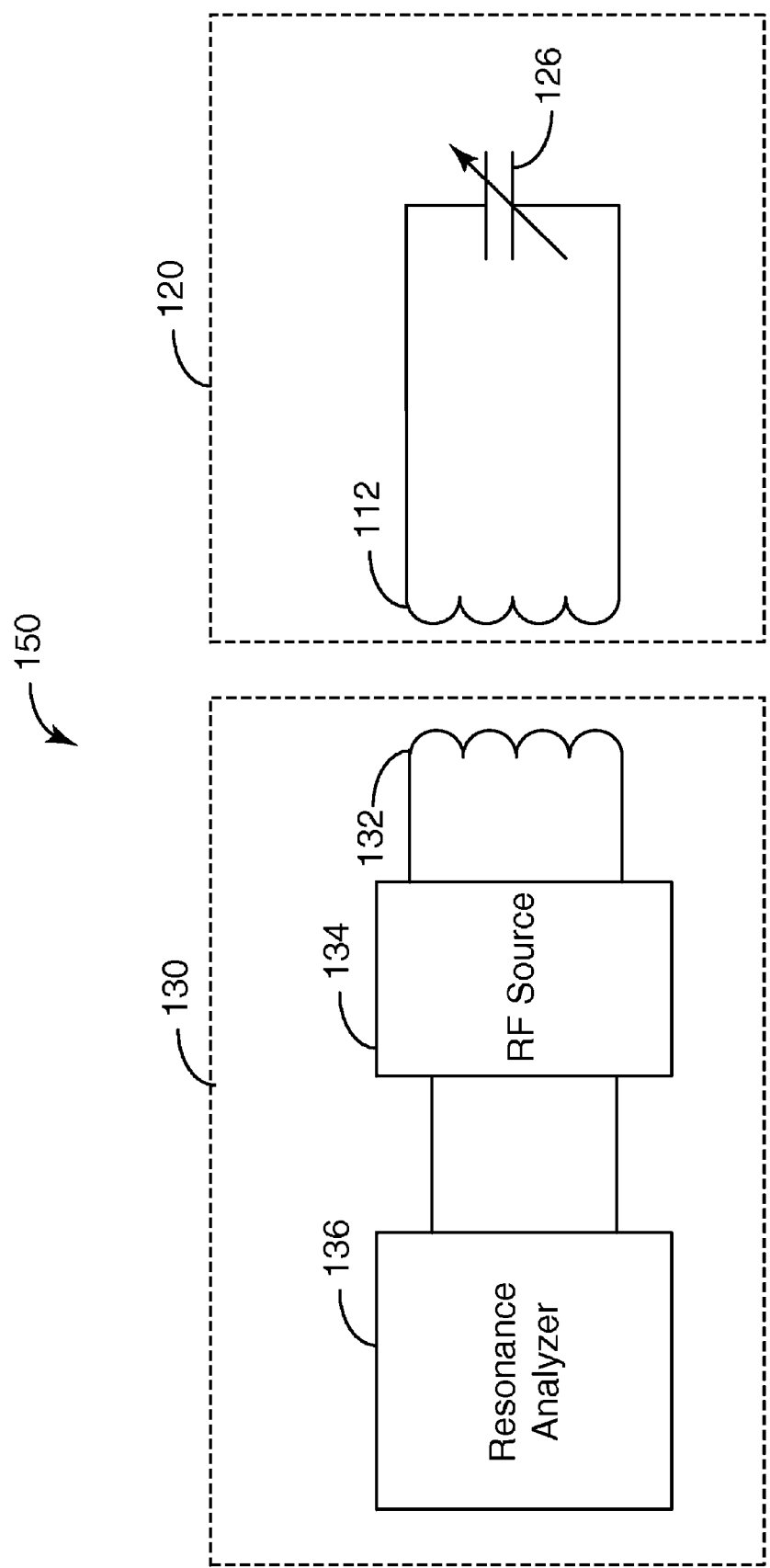

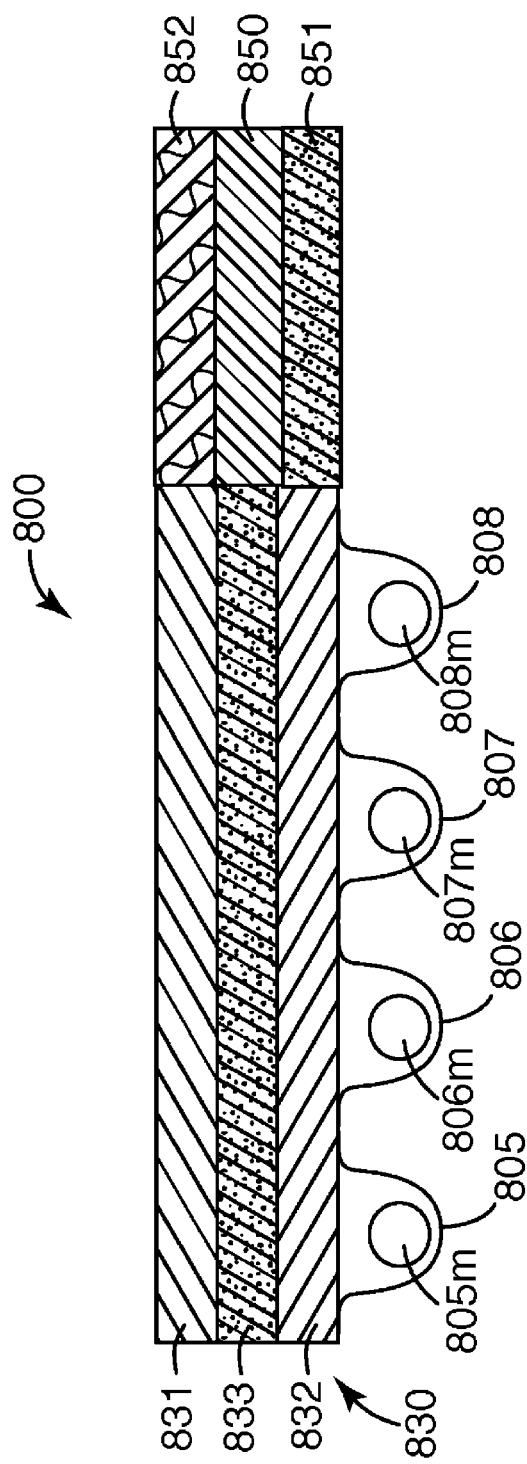
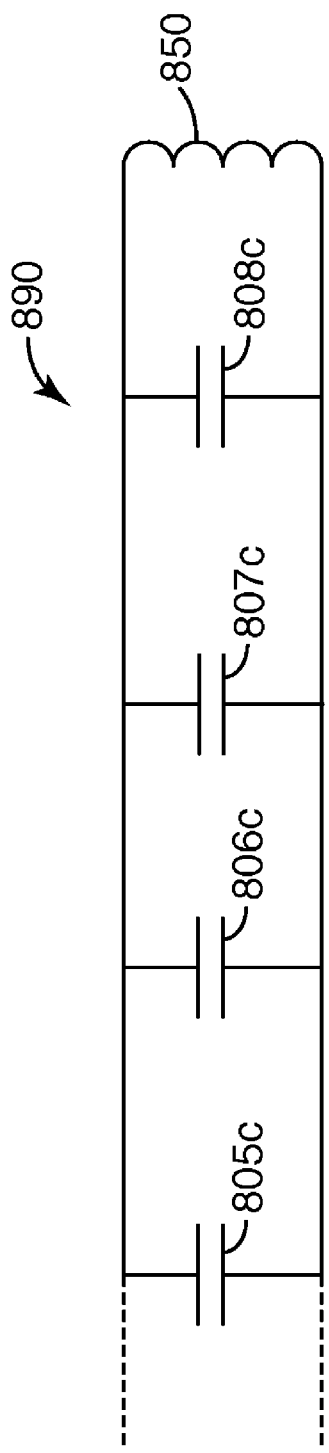
*Figure 8C*
*Figure 8D*

SPATIALLY DISTRIBUTED REMOTE SENSOR

RELATED PATENT DOCUMENTS

This patent application is related to commonly owned U.S. Pat. No. 7,456,744 entitled "SYSTEMS AND METHODS FOR REMOTE SENSING USING INDUCTIVELY COUPLED TRANSDUCERS," filed concurrently herewith and incorporated herein by reference.

TECHNICAL FIELD

The present invention is related to sensors, and more particularly, to sensors that are remotely accessible by inductive coupling.

BACKGROUND

Radio frequency identification (RFID) circuitry has been used to detect the presence and movement of articles of interest. The presence of an article bearing an RFID tag may be electronically detected by wirelessly interrogating the RFID tag, either intermittently or continuously. In a typical application, the RFID tag stores an identification (ID) code. When interrogated by an RFID tag reader, the RFID tag wirelessly transmits its ID code to the RFID tag reader. The code transmitted by the RFID tag to the RFID tag reader indicates the presence and identification of the article bearing the RFID tag.

RFID tags may include a battery or other independent power source, or they may acquire their power from the signal transmitted by the external RFID tag reader. RFID tags without independent power are particularly small and inexpensive, making them very cost effective for tracking a large number of objects.

A technology related to RFID involves electronic article surveillance (EAS) tags. Both EAS and RFID tags are remotely accessible, but EAS tags typically do not include the data storage capabilities of RFID. Both EAS and RFID tags include a transponder circuit for remote access. The transponder circuit is a resonant circuit having components selected and arranged so that the transponder electrically resonates at a particular frequency.

If an electromagnetic signal at or near the transponder resonant frequency is emitted from a tag reader within range of the EAS tag, the EAS transponder circuit absorbs and/or reflects energy from the electromagnetic field emitted by the reader through inductive coupling. The energy absorbed or reflected by the transponder circuit can produce a change in the output signal of the tag reader output coil or in the input signal at the tag reader receiving coil. These signal changes may be interpreted to indicate the presence of an EAS tagged article.

In some applications, it is desirable to remotely acquire sensor information. The remote access capabilities of RFID and EAS tags may be combined with sensor technology to provide remote sensing capability. The present invention fulfills these and other needs, and offers other advantages over the prior art.

SUMMARY

The present invention is directed to devices, methods, and systems involving inductively coupled sensors, and in particular, to sensors providing the capability of remote sensing over an area of interest. One embodiment is directed to a remote sensing device comprising a plurality of components including at least an inductor and a capacitor which are arranged to form a resonant electrical circuit. At least one component of the plurality of components has elements distributed among regions of an area of interest. The elements are arranged so that a resonant characteristic of the resonant circuit is modifiable by an external event affecting an element associated with a region. According to one aspect of the invention, the distributed component comprises a capacitor and the elements are capacitive elements. According to another aspect, the distributed component comprises an inductor and the elements are inductive elements.

The external event may causes a change in an electrical parameter of the at least one component. The external event may alter a material property associated with the element, the alteration of the material property causing a change in an electrical parameter of the at least one component. The change in the electrical parameter changes the resonant characteristic of the circuit, such as the resonant frequency.

The external event may include, for example, exposure of the element to an environmental condition, disconnection of the element from the resonant circuit, or short circuiting the element, for example.

According to one implementation, the area of interest comprises a ticket object and one or more of the elements are associated with individual tickets of the ticket object. In this implementation, the external event involves removal of an individual ticket from the ticket object.

According to another implementation, the area of interest comprises a medical dressing and the elements are distributed among the regions of the medical dressing. The external event comprises exposure of the medical dressing to a fluid.

In a further implementation, the area of interest comprises an object dispenser and the regions are associated with object containers of the object dispenser. The external event comprises removal of an object from an object container.

According to a further implementation, the area of interest comprises a gauge having calibrated regions, the regions calibrated to measure the external event.

Another embodiment of the invention involves a method for sensing external events using a remote sensing device. The remote sensing device includes at least an inductor and a capacitor forming a sensing circuit having a resonant frequency. At least one of the components of the remote sensing device includes a number of sensing elements. The sensing elements are respectively associated with regions of an area of interest. The resonant frequency of the circuit is modified based on an external event affecting a sensing element associated with a region.

Associating the sensing elements with the regions may involve positioning each sensing element relative to an associated region. The resonant frequency may be modified based on exposure of the sensing element to an environmental condition.

In a further implementation, the modification of the resonant frequency of the sensing circuit is detected and interpreted as indicating an occurrence of the external event. According to some aspects of the invention, a signal produced by a reference circuit may be used in the interpretation of the modified resonant frequency, such as be normalizing the signal produced by the sensing circuit based on the reference signal.

Another embodiment of the invention is directed to a remote sensing system. The remote sensing system includes a device comprising a plurality of components including at least an inductor and a capacitor arranged to form a sensing circuit having a resonant characteristic. At least one component of the plurality of components includes elements respectively associated with regions of an area of interest. The elements are arranged so that a resonant characteristic of the sensing circuit is modifiable by an external event affecting an element associated with a region. The remote sensing system also includes an interrogator configured to detect the resonant characteristic. The interrogator may be configured to interpret the modification of the resonant characteristic as indicating an occurrence of the external event.

According to one aspect, the system includes a reference circuit isolated from the external event and configured to produce a reference signal and the interrogator is configured to use the reference signal to interpret a modification of the resonant characteristic of the sensing circuit as indicating an occurrence of the external event. For example, the interrogator may be configured to use the reference signal to normalize a signal of the sensing circuit with respect to at least one of distance and orientation relative to the interrogator.

In one implementation of the system, the regions comprise ticket objects and the interrogator is disposed in a dispenser of the ticket objects. In another implementation, the regions comprise accessible sections of a blister pack and the interrogator is disposed in a blister pack dispenser.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

DESCRIPTION OF THE DRAWINGS

FIG. 1C illustrates a remote sensing system including an interrogator and a resonant circuit having a capacitive sensor in accordance with embodiments of the invention;

FIG. 8C illustrates a cross section of the object dispenser of FIGS. 8A and 8B;

FIG. 8D illustrates the circuit model for a sensing circuit of the object dispenser FIGS. 8A and 8B in accordance with embodiments of the invention;

Figure 1A:
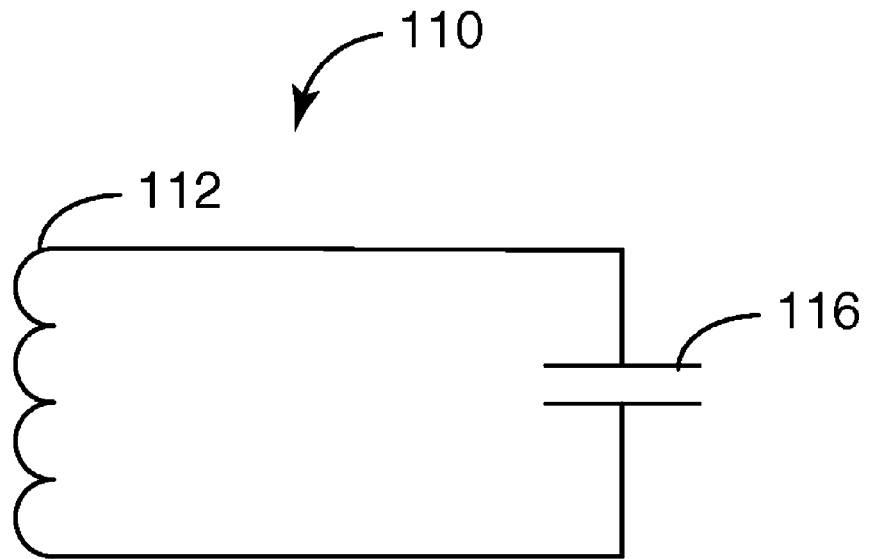
FIG. 1A is a schematic diagram illustrating a resonant circuit 110 used for EAS/RFID applications.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following description of the illustrated embodiments, reference is made to the accompanying drawings that form a part hereof, and in which are shown by way of illustration, various embodiments in which the invention may be practiced. It is to be understood that the embodiments may be utilized and structural changes may be made without departing from the scope of the present invention.

Embodiments of the present invention are directed to methods, devices, and systems for remote sensing. The approaches of the present invention join together aspects of electronic article surveillance (EAS) or radio frequency identification (RFID) technology and sensor technology. In some embodiments, the sensors are interdigitated transducers, as described in more detail below. In some embodiments, the sensor may include a number of elements that are spatially distributed, allowing remote sensing over an area of interest. In some embodiments, a signal produced by a reference circuit may be used by a reader in conjunction with the sensor signal to account for variations in the sensor signal. The sensor signal variations may arise, for example, due to changes in alignment and distance of the sensor relative to the reader, due to changes in inductive coupling between the sensor and the reader, due to electromagnetic interference and/or due to variations of certain other ambient conditions.

FIG. 1A is a schematic diagram illustrating a resonant circuit 110 used for EAS/RFID applications. An EAS/RFID device capable of remote access may use a simple circuit including an inductor 112 and a capacitor 116 in parallel. In some applications, a resistor may also be included in the resonant circuit 110. The circuit 110 is designed to resonate at a specific frequency that is dependent on the values of the circuit components 112, 116. The inductor 112 acts as an antenna used to receive, reflect and/or transmit electromagnetic energy, such as radio frequency (RF) energy. In some applications, additional circuitry (not shown) is coupled to the resonant circuit 110 for outputting an identification code via the antenna. Devices that are capable of transmitting a code are typically referred to as RFID devices. Devices without the additional circuitry for outputting the ID code are often referred to as EAS device. An EAS device is designed to absorb and disrupt an electromagnetic (EM) field, such as an RF field, emitted by a reader. The disruption of the EM field may be detected by the reader and interpreted to indicate the presence of an EAS device.

In accordance with embodiments of the invention, an EAS or RFID-based sensing circuit includes at least one component that functions as a sensor. For example, one or both of the components 112, 116 of the resonant circuit 110 depicted in FIG. 1A may function as a sensor. The sensor component is capable of altering one or more resonant characteristics of the resonant circuit based on a sensed condition. In various applications, the alterable resonant characteristic may include the resonant frequency, Q factor, bandwidth, or other resonant characteristics of the resonant circuit 110.

Figure 1B:
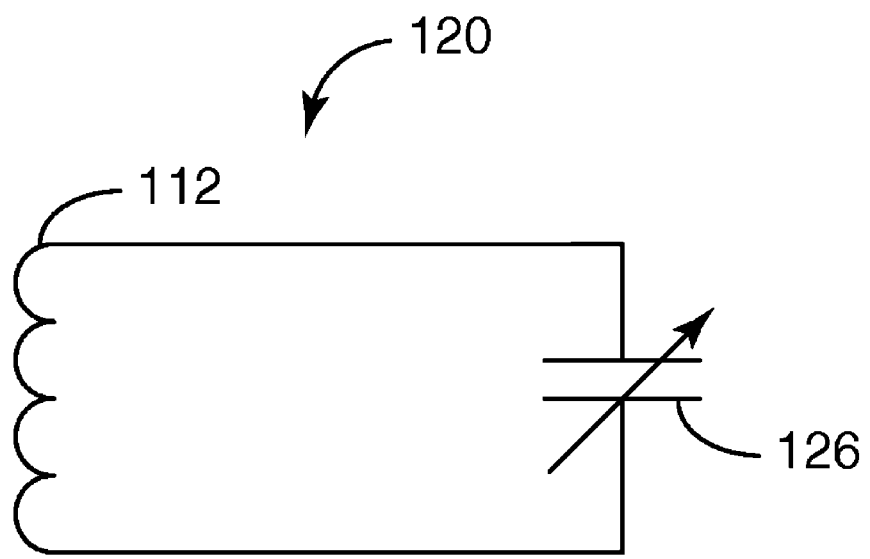
FIG. 1B is a schematic diagram illustrating a resonant circuit that includes a variable sensing component in accordance with embodiments of the invention.

The schematic of FIG. 1B illustrates a resonant circuit 120 that includes a inductor 112 and a variable sensing component which in this example is a capacitive sensor 126. The capacitor sensor 126 is configured to change capacitance value based on a sensed condition. Variations in the capacitance value cause a change in the resonant frequency of the resonant circuit 120. The change in the resonant frequency can be remotely detected and interpreted by an RFID or EAS reader.

Changes in the resonant frequency, or other resonant characteristic, may be interpreted to indicate one or more corresponding changes in the sensed condition. According to some implementations, changes in the resonant frequency of the circuit 120 can be interpreted to determine an amount, degree, or duration of change in the sensed condition. According to yet other implementations, detecting changes in the resonant frequency of the circuit 120 over a period of time may be used to track the progression of change in the sensed condition over the time period.

FIG. 1C illustrates a remote sensing system 150 including a reader 130, also denoted herein as an interrogator, and a resonant circuit 120 having a capacitive sensor 126. The interrogator 130 includes a radio frequency (RF) source 134 and resonance analyzer 136.

The interrogator 130 includes an inductor 132 that serves as an antenna to transmit an RF signal to the resonant circuit 120. The resonant circuit absorbs and reflects RF energy near the resonant frequency of the circuit. The interrogator 130 may be configured to detect changes in the transmitted signal caused by the absorption and/or reflection of RF energy by the sensing circuit 120. Perturbations in the interrogator signal which are attributable to absorption/reflection of energy by the sensing circuit 120 and/or detection of a signal reflected by the sensing circuit 120 are denoted herein as the sensing signal or sensing circuit signal.

Figure 1D:
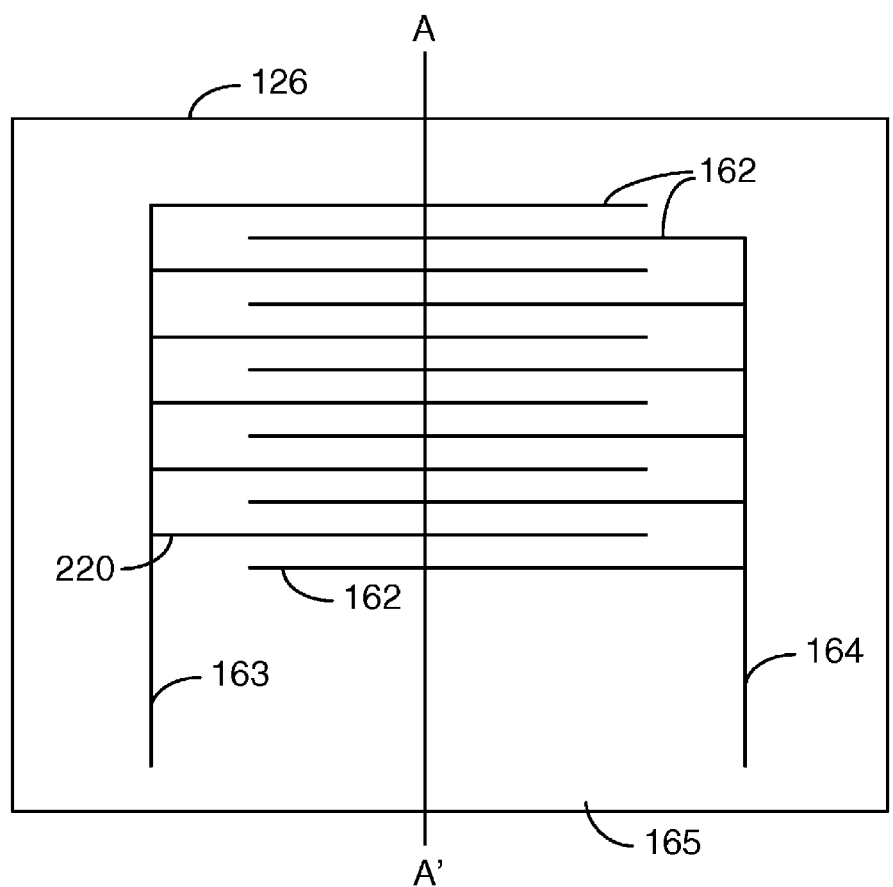
FIGS. 1D and 1E illustrate plan and cross-sectional views, respectively, of a capacitive sensor having interdigitated elements that may be used in a sensing circuit in accordance with embodiments of the invention.
Figure 1E:
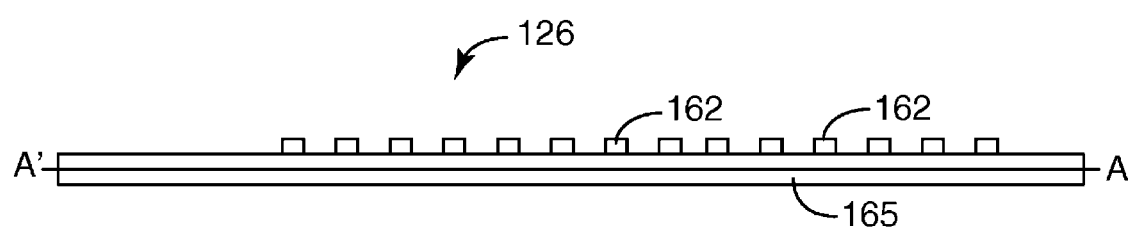

FIGS. 1D and 1E illustrate plan and cross-sectional views, respectively, of an interdigitated capacitive sensor 126 that may be used as the sensor component in the resonant circuit 120 illustrated in FIGS. 1B and 1C. The capacitive sensor 126 is configured as an interdigitated transducer formed by two electrical conductors 163, 164 on a substrate 165. The electrical conductors 163, 164 are associated with a number of electrodes 162 that are interleaved. The electrical conductors 163, 164 and their associated electrodes 162 form the opposing plates of a capacitor, having a capacitance value dependent on the number, length, and separation distance of the interleaved electrodes 162 and the dielectric properties of the material disposed between the interleaved electrodes 162 of the opposing conductors 163, 164.

In some embodiments, the approaches of the present invention may involve remote sensing of an environmental condition such as exposure to moisture or other fluid. Moisture in contact with the surface of the sensor 126 causes a change in the dielectric constant of the material between the interleaved electrodes 162, as the material absorbs or adsorbs the moisture. The absorption or adsorption causes a change in the capacitance of the sensor 126, and thus a corresponding change in the resonant frequency of the resonant circuit 120.

In another implementation, the capacitive sensor 126 may be used to detect a chemical change in an analyte. For example, the surface of the open-faced interdigitated sensor 126 may be exposed to the analyte. Chemical and/or physical changes in the analyte cause the dielectric properties of the analyte to change, which, in turn, causes a change in the capacitance of the sensor 126. The change in capacitance is detectable as a resonant frequency shift of the resonant circuit 120. In some implementations, prior to exposure to the analyte, the sensor 126 may be coated with a material that absorbs or specifically binds to the analyte.

A change in the resonant frequency may be the result of a change in the dimensions of the sensor. For example, the capacitance value of the capacitive sensor 126 may change based on a dimensional change that alters the physical relationship between the capacitor plates 163, 164. Such a dimensional change may occur, for example, due to expansion or contraction of the sensor causing a change in the positional relationship of the capacitor plates 163, 164. The expansion or contraction of the sensor may be caused by exposure to various events or conditions, such as light, temperature, and/or moisture, for example.

The sensing circuit signal may be affected by various conditions affecting the inductive coupling between the sensing circuit and the interrogator. For example, the sensing circuit signal may be varied due to orientation and/or distance from of the sensing circuit from the interrogator, electromagnetic interference, nearby metallic material, material interposed between the sensing circuit and the interrogator, changes in ambient temperature and/or other factors.

A reference signal may be used to account for measurement to measurement variation in the sensing circuit signal due to the above parameters.

Figure 2:
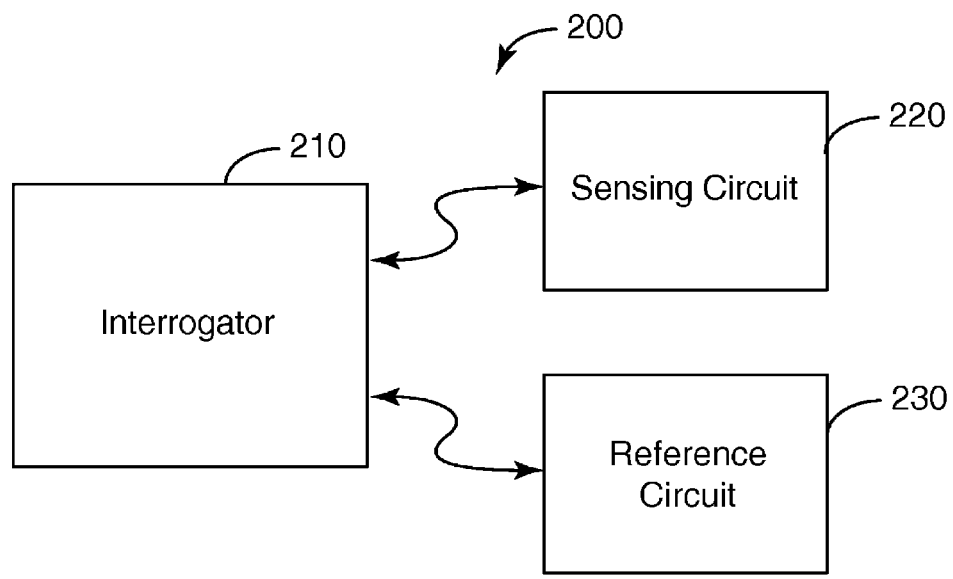
FIG. 2 is a block diagram illustrating a remote sensing system including a sensing circuit and a reference circuit in accordance with embodiments of the invention.

In one embodiment, the signal produced by the sensing circuit may be normalized for orientation and/or distance based on the reference signal. If the interference exceeds requirements for a quality measurement, an alarm state may be initiated. A remote sensing system 200 including a sensing circuit 220 and a reference circuit 230 is depicted in the block diagram of FIG. 2. Shifts in the resonant frequency of the sensing circuit 220 may be interpreted using the signal produced by the reference circuit 230.

In some implementations, the reference circuit 230 has a similar configuration to the sensing circuit 220 and absorbs and reflects RF energy near the resonant frequency of the reference circuit. The interrogator 210 may be configured to detect changes in the transmitted signal caused by the absorption and/or reflection of RF energy by the reference circuit. Perturbations in the interrogator signal which are attributable to absorption/reflection of energy by the reference circuit 230 and/or detection of a signal reflected by the reference circuit 230 are denoted herein as the reference signal or reference circuit signal. The reference circuit 230 depicted in FIG. 2 may comprise a resonant circuit without a sensor component. The reference circuit 230 is disposed in a fixed relationship with the sensing circuit 220. The sensing circuit 220 and the reference circuit 230 need not be electrically connected. The reference circuit 230 may be shielded from conditions that could affect the resonant characteristics of the reference circuit 230. The reference circuit 230 may incorporate a resonant circuit having resonant characteristics, such as resonant frequency, that are distinct from the resonant characteristics of the sensing circuit 220. In some implementations, the reference circuit 230 may comprise an RFID device that includes circuitry for storing and transmitting an identification code and/or other data such as the initial resonance parameters of the sensing circuit.

Figure 3A:
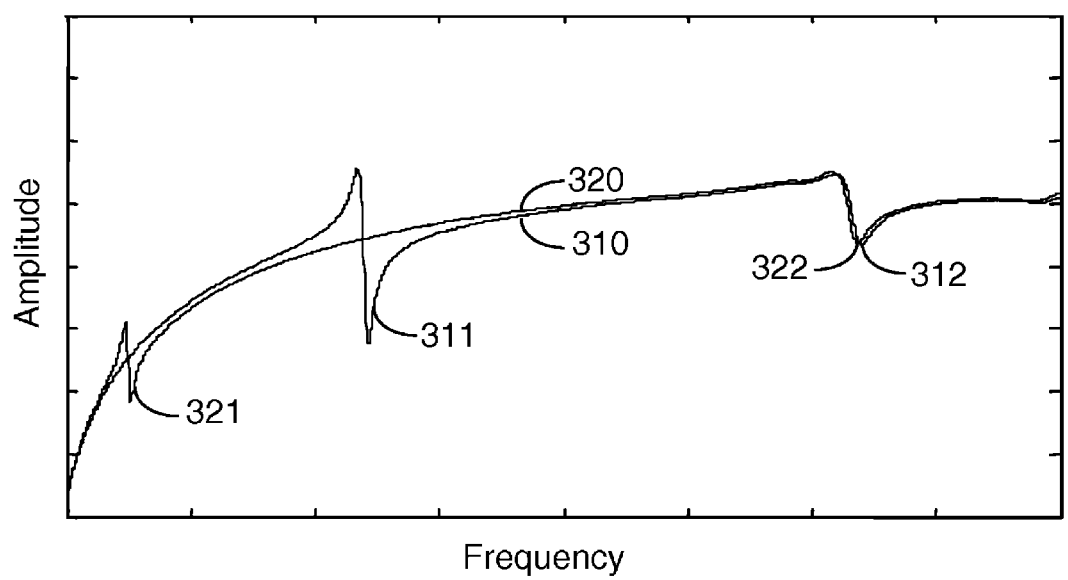
FIG. 3A depicts graphs of signals produced by a sensing circuit and a reference circuit arranged in accordance with embodiments of the invention, the graphs showing signals before and after the occurrence of an external event.

FIG. 3A depicts graphs of signals 310, 320 produced by the sensing circuit and reference circuit responsive to frequency scans by the interrogator at times $t_1$ and $t_2$, respectively. The signal 310 at time $t_1$ includes a signal feature 311 produced by the sensing circuit and associated with the initial resonant frequency of the sensing circuit. The signal 320 at time $t_2$ includes a signal feature 321 produced by the sensing circuit and associated with the resonant frequency of the sensing circuit after exposure to the sensed condition. Comparison of the signals 310, 320 shows a shift in the frequency of the signal feature produced by the sensing circuit due to the sensed condition. The signals 310 and 320 also exhibit signal features 312, 322 produced by the reference circuit at times $t_1$ and $t_2$, respectively. These signal features 312, 322 are associated with the resonant frequency of the reference circuit which remains substantially unchanged. It will be understood that although this example depicts a downward shift in resonant frequency caused by exposure to the sensed condition, in other configurations, exposure to the sensed condition may cause an upward shift in resonant frequency.

Figure 3B:
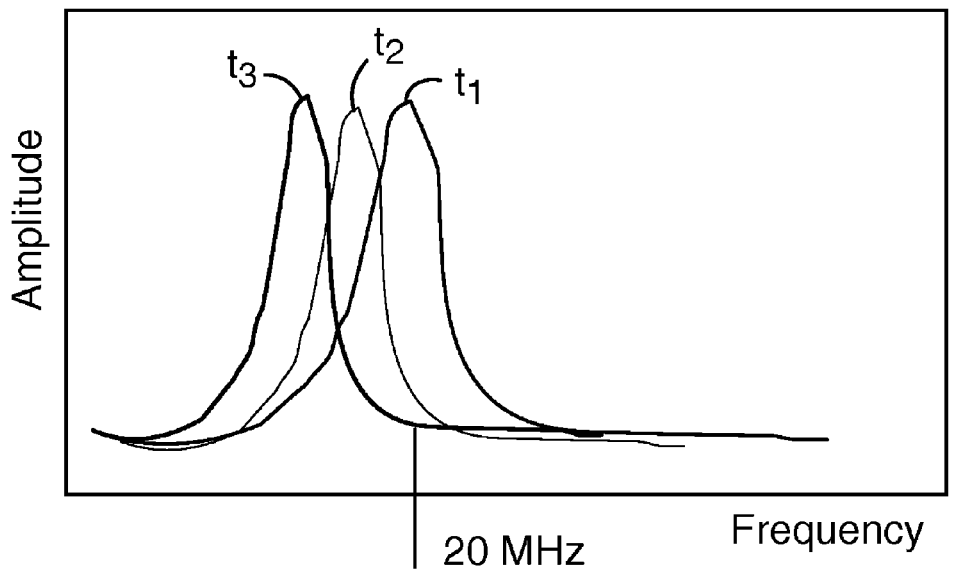
FIG. 3B shows a graph illustrating changes in the amplitude of frequency spectra of the sensing circuit signal before and after the occurrence of an external event in accordance with embodiments of the invention.

The graph of FIG. 3B illustrates changes in the frequency response characteristic of the sensing circuit at times $t_1$, $t_2$, and $t_3$. In this example, the sensing circuit is initially tuned at time $t_1$ to a resonant frequency of 20 MHz. The resonant frequency shifts to successively lower frequencies at times $t_2$ and $t_3$ due to exposure to the sensed condition. In this example, the amplitude and shape of the sensing circuit signal at times $t_1$, $t_2$, and $t_3$ remain substantially unchanged. If the orientation or position of the sensing circuit varies, the frequency response characteristic of the signal produced by the sensing circuit will also vary in amplitude as a function of position and/or orientation.

Figure 3C:
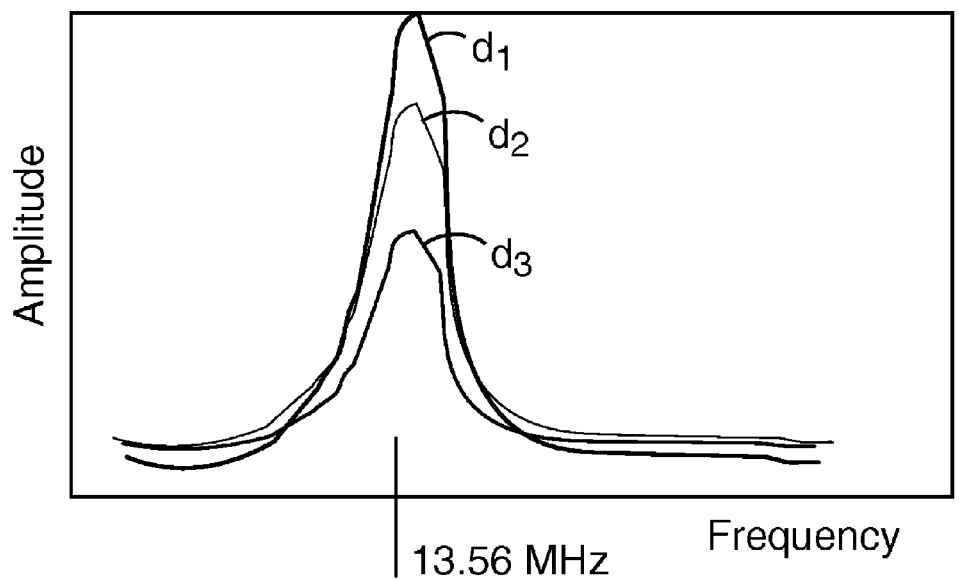
FIG. 3C shows a graph illustrating the frequency spectra of a reference circuit signal, the reference circuit inductively coupled to an interrogator positioned at distances $d_1$, $d_2$, and $d_3$ from the reference circuit in accordance with embodiments of the invention.
Figure 3D:
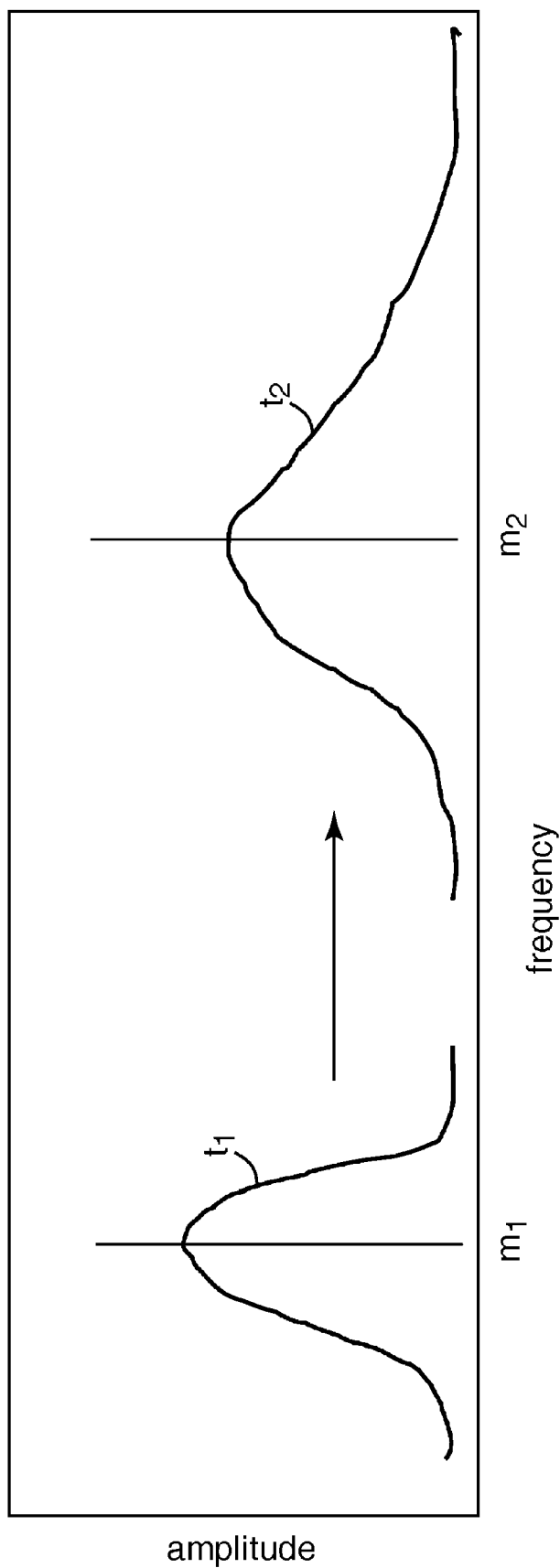
FIG. 3D shows a graph illustrating changes in reference signal shape that can be used to account for variations affecting the inductive coupling between a sensing circuit and a reader in accordance with embodiments of the invention.

As previously discussed, changes in the signals produced by the sensing and/or reference circuits due to changes in conditions unrelated to the sensed condition may occur. These changes may involve variations in the amplitude and/or shape of the frequency response signals. The changes in the sensor signal due to the conditions unrelated to the sensed condition may be identified using the reference signal. The use of the reference signal is illustrated in FIGS. 3C and 3D. Analysis of the signal produced by the sensing circuit may make use of the reference signal to remove the effects of interference, distance, orientation, and/or various parameters that alter the inductive coupling between the sensing circuit and the reader. The graphs of FIG. 3C illustrates the frequency spectra of a reference circuit signal, where the reference circuit is inductively coupled to an interrogator positioned at distances $d_1$, $d_2$, and $d_3$ from the reference circuit and $d_1 < d_2 < d_3$. The reference circuit is tuned to a resonant frequency of 13.56 MHz which in this example does not change because the reference circuit is not affected by the sensed condition. The amplitude of the signal produced by the reference circuit decreases with increasing distance between the interrogator and the reference circuit.

The signal at 13.56 MHz produced by the reference circuit exhibits changes in amplitude due to distance between the reference circuit and the interrogator, whereas the resonant frequency of the reference circuit may remain relatively constant if the reference circuit is isolated from the sensed condition. During successive interrogations, the signal produced by the sensing circuit may exhibit changes produced by a combination of factors, including factors related to the sensed condition and factors unrelated to the sensed condition. For example, during successive interrogations, the sensing circuit signal may exhibit changes in amplitude due to variations in distance from the interrogator and also exhibit a shift in resonant frequency due to the sensed condition.

In some implementations, factors unrelated to the sensed condition may cause changes in signal frequency characteristics other than variations in amplitude. The graphs of FIG. 3D illustrate changes in the distribution of frequencies around a mean value of a reference signal that may be caused by factors unrelated to the sensed condition. Such changes, which are observed in both the reference signal and the sensor signal can be used to account for interference, variations in position, inductive, and/or other parameters affecting inductive coupling between the sensing device and the interrogator. The graphs of FIG. 3D illustrate changes in the frequency response characteristic of a reference circuit signal at times $t_1$, and $t_2$. In this example, at time $t_1$ the frequency response characteristic of the reference circuit signal is represented by a frequency distribution about a mean value, $m_1$. At time $t_2$, the mean value of the frequency distribution shifts to $m_2$ and the shape of the distribution exhibit changes. The frequency shift and changes in the shape of the frequency distribution of the reference circuit signal may be due to variations in inductive coupling not specifically related to the condition sensed by the sensing circuit. Changes in the shape of the frequency distribution may be quantified by the skewness or kurtosis of the frequency distribution. The amount of skewness is related to the asymmetrical distribution of frequencies about the mean. Kurtosis represents the degree of peakedness of the frequency distribution. In this example, the first measurement at time t1 exhibits a normal frequency distribution about m1. The measurement at time t2 exhibits a skewed distribution about m2 with a lower kurtosis.

In one implementation, the signal produced by the sensing circuit may be normalized using the reference circuit signal. Normalization of the sensing circuit signal using the reference circuit signal allows resonance frequency shifts in the sensing circuit signal to be more easily interpreted as corresponding to changes in the sensed condition. If the reference circuit is an RFID device, data can be written to the RFID device, such as data related to one or more previous interrogations of the sensing circuit. If the reference device is an EAS device, then a database coupled to the interrogator can be used to manage the data from the sensing circuit interrogations.

Figure 4A:
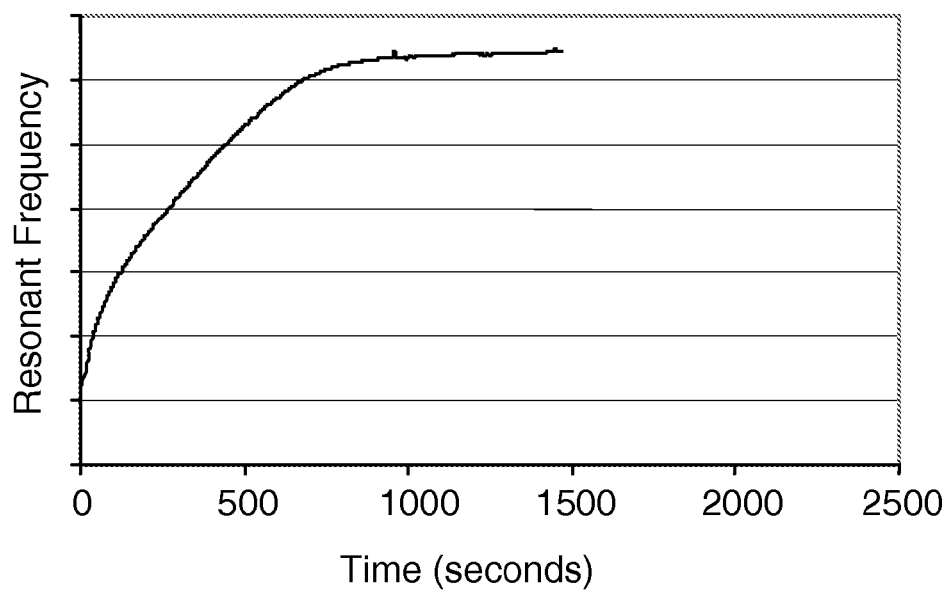
FIG. 4A depicts a graph showing the shift in resonant frequency of a sensing circuit in accordance with an embodiment of the present invention exposed to a material in the process of polymerization.
Figure 4B:
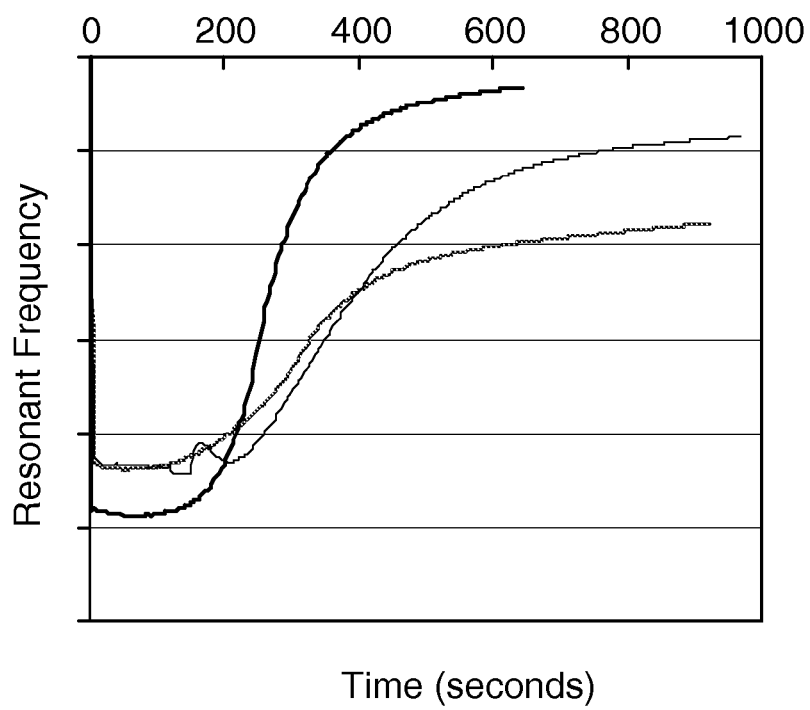
FIG. 4B illustrates superimposed graphs showing changes in resonant frequencies of three sensing circuits in accordance with an embodiment of the present invention exposed to three different mixtures of epoxy during curing.

In various implementations, the sensing circuit of the present invention may be used to detect changing conditions over a period of time. For example, the sensing circuit may be used to detect curing, drying, exposure to fluids, gases, moisture, or other conditions. FIG. 4A depicts a graph showing the shift in resonant frequency for a sensing circuit of the present invention exposed to a material in the process of polymerization. The resonance peak of the sensing circuit shifts over time as the material polymerizes. After several minutes, the change in resonant frequency of the sensing circuit reaches equilibrium indicating that the material has cured. FIG. 4B illustrates superimposed graphs showing the changes in resonant frequencies of three sensing circuits exposed to three different mixtures of two-part epoxy. Each mixture represents a different ratio of the two components forming the epoxy. FIG. 4B depicts the changes in resonant frequency of each sensing circuit over time as each mixture cures. Each mixture produces a different resonance shift signature during the curing period.

Figure 5A:
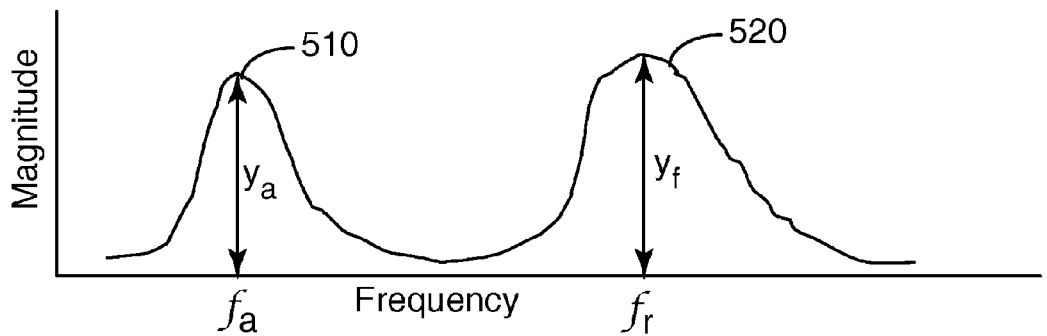
FIG. 5A is a graph illustrating spectral characteristics of a reference signal and a sensor signal in accordance with embodiments of the invention.

Methods implementable by the interrogator that use the reference signal to account for variations in position and/or distance between the sensing circuit and the interrogator are described in connection with FIGS. 5A and 5B. FIG. 5A is a graph illustrating the frequency spectrum produced by the reference circuit and the sensing circuit. The graph illustrates a first spectral characteristic 510 associated with the signal produced by the sensing circuit and a second spectral characteristic associated with the signal produced by the reference circuit. The spectral characteristic 510 of the sensing signal is associated with various parameters, such as peak frequency, $f_a$, peak magnitude, $y_a$, skew, $\gamma_a$, kurtosis, $\beta_a$, and/or other spectral parameters. The spectral characteristic 520 of the reference signal is associated with various parameters, such as peak frequency, $f_r$, peak magnitude, $y_r$, skew, $\gamma_r$, kurtosis, $\beta_r$, and/or other spectral parameters. One or more of the parameters of the reference signal spectral characteristic may be used to correct the sensing signal characteristic to account for variations in position and orientation of the sensing circuit with respect to the interrogator.

Figure 5B:
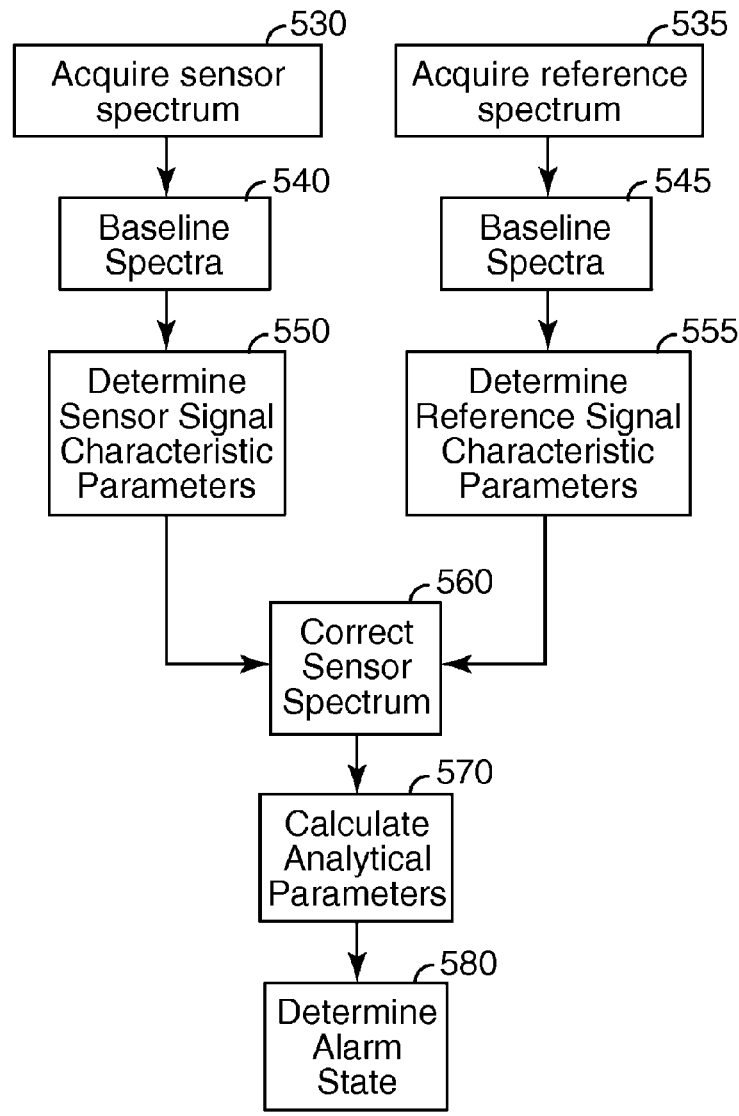
FIG. 5B is a flow chart illustrating a method for using the reference signal characteristics to adjust the sensor signal and for generating an alarm in accordance with embodiments of the invention.

The flowchart of FIG. 5B further illustrates signal correction methods implemented by the interrogator in accordance with embodiments of the invention. The interrogator performs an analysis of the frequency spectrum to acquire 530, 535 the spectral characteristics of the sensing signal and the reference signal. A baseline is determined 540, 545 for the sensing signal spectral characteristic and the reference signal spectral characteristic. Parameters of the sensing signal characteristic and the reference signal characteristic, such as the peak frequency, peak magnitude, kurtosis, skew, and/or other parameters are calculated 550, 555. One or more of the reference signal characteristic parameters are used to correct the sensing signal spectral characteristic. For example, in one embodiment, the peak magnitude, $y_r$, of the reference signal spectral characteristic is used to normalize 560 the peak magnitude, $y_a$, of the sensing signal spectral characteristic according to the equation:

$$n_y = \frac{y_a}{y_r}.$$

The analytical parameters of the sensing signal characteristic are calculated 570 based on the reference signal characteristic. For example, the frequency shift of the sensing signal characteristic peak frequency from the reference signal characteristic peak frequency is at time $t_1$:

$$f(t_1) = f_r(t_1) - f_a(t_1),$$

and at time $t_2$, $$f(t_2) = f_r(t_2) - f_a(t_2),$$

where $f_r(t_1)$ and $f_r(t_2)$ are the peak frequencies of the reference signal characteristic at times $t_1$ and $t_2$, respectively, and $f_a(t_1)$ and $f_a(t_2)$ are the peak frequencies of the sensing circuit characteristic at times $t_1$ and $t_2$, respectively.

Thus, because the peak frequency of the reference signal characteristic remains constant at times $t_1$ and $t_2$, the change in the peak frequency of the sensing signal characteristic from time $t_1$ to time $t_2$ may be calculated:

$$\Delta f = (f(t_1) - f(t_2)) = -f_a(t_1) + f_a(t_2).$$

In some embodiments, successive measurements of the peak frequencies of the reference and sensing circuits may be made over a period of time to track the exposure of the sensing circuit to an environmental condition. For example, successive measurements may be used to track the progress of a reaction.

In some embodiments, changes in the spectral characteristics of the sensing circuit and/or the reference circuit may be used to generate 580 an alarm. In one embodiment, the shift of the peak frequency of the sensing signal characteristic, $\Delta f$, may be compared to a threshold value. A frequency shift greater than a threshold value may trigger an alarm, such as to indicate that the environmental exposure corresponds to a critical or desired amount of exposure or that a reaction has concluded.

In another embodiment, a change in the peak magnitude of the reference circuit may trigger a alarm to indicate that the sensing and reference circuits are not within a desired range of the reader. In yet other embodiments, the difference $y_a - y_r$ between the peak magnitude of the reference circuit, $y_r$, and the peak magnitude of the sensing circuit, $y_a$, may be used to generate an alarm. An alarm may also be generated based on various other parameters of the spectral characteristics of the sensing circuit and/or the reference circuit, including the characteristic skew, kurtosis, and/or best fit residuals.

Figure 6A:
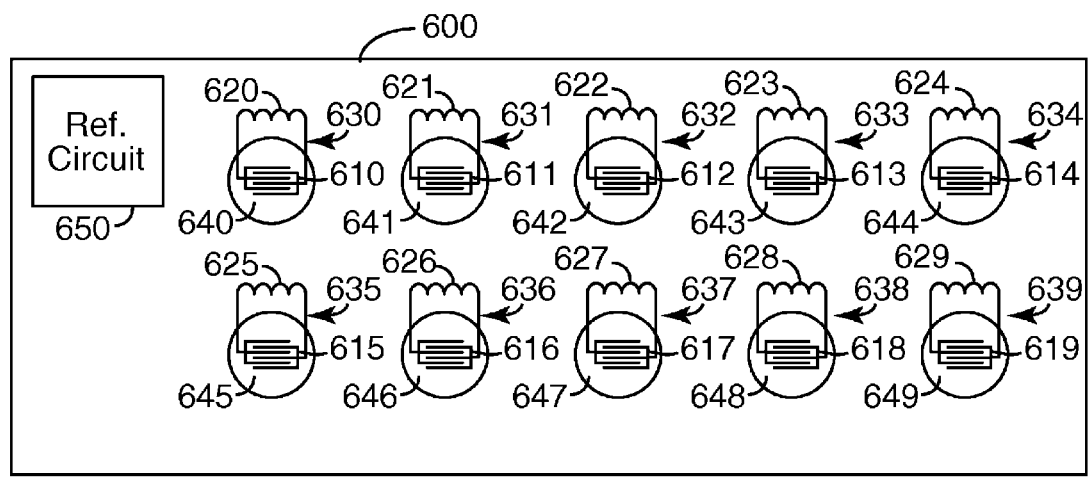
FIG. 6A illustrates sensing circuits comprising interdigitated capacitive elements placed in reaction wells of a reaction plate and used for sensing the status of chemical reactions in accordance with embodiments of the invention.

As previously discussed, in some implementations, sensing circuits of the present invention may be used to monitor the progression of chemical reactions. As illustrated in FIG. 6A, interdigitated capacitors 610-619 may be placed in reaction wells 640-649 of a reaction plate 600. The sensing circuits 630-639 including the interdigitated capacitors 610-619 may be used to monitor different samples in a reaction plate, for example. Although the reaction plate 600 illustrated in FIG. 6A shows 10 reaction wells 640-649, more or fewer reaction wells may be used. Each capacitor 610-619 is coupled to an inductor 620-629, forming individually addressable sensing circuits 630-639. The signals produced by the sensing circuits 630-639 may be differentiated from each other by one or more signal characteristics. For example, the components used for the sensing circuits 630-639 may be selected so that each sensing circuit 630-639 is associated with a different resonant frequency, Q factor, bandwidth, phase, or amplitude.

In one embodiment, the differentiating characteristic comprises the resonant frequencies of the sensing circuits 630-639, and each sensing circuit 630-639 is tuned to a different resonant frequency. The sensing circuits 630-639 may be remotely interrogated by placing the reaction plate 600 near an antenna of an interrogator and scanning across the resonant frequency range of the sensing circuits 630-639. The status of the reaction occurring in each reaction well 640-649 can be determined by analyzing the shifts in the resonant peaks associated with the sensing circuits 630-639. Optionally, a reference circuit 650 may be disposed on or near the reaction plate at a fixed position with respect to the sensing circuits. The signal from the reference circuit may be used to adjust signals produced by the sensing circuits 630-639 to take into account changes in distance and orientation of the sensing circuits 630-639 relative to the interrogator for successive interrogations.

Figure 6B:
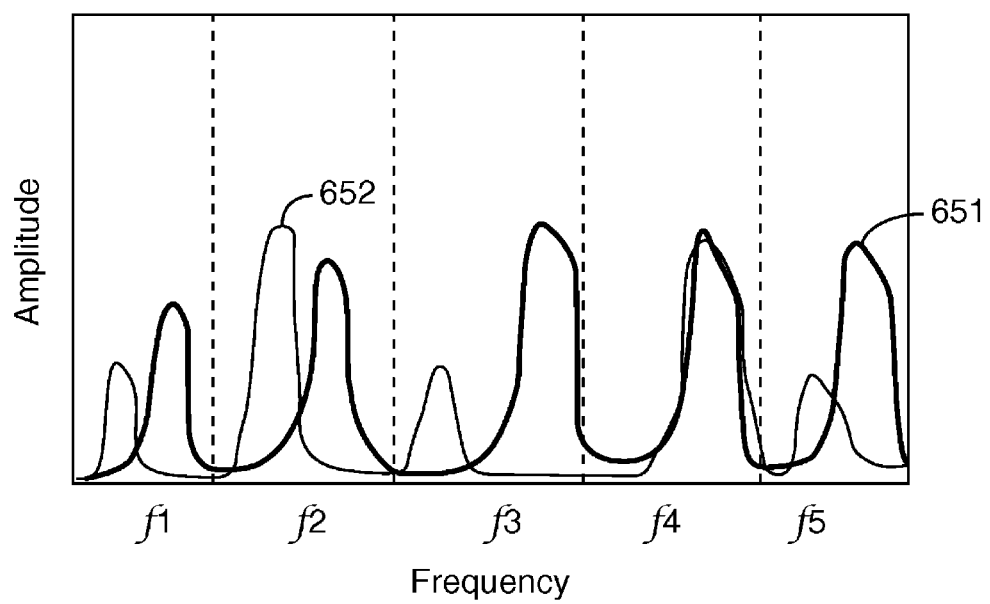
FIG. 6B depicts superimposed graphs of frequency scans exhibiting resonant frequency shifts in signals produced by sensing circuits configured according to embodiments of the invention and disposed in a five well reaction plate.

FIG. 6B depicts superimposed graphs 651, 652 of frequency scans of sensing circuits disposed in a five well reaction plate. Graph 651 represents an initial frequency scan and graph 652 represents a frequency scan taken after chemical reactions have begun. The shift in the resonant frequency of a sensing circuit in a particular reaction well indicates the progress of the chemical reaction occurring in the reaction well. The spectrum of peaks may be monitored over time during the progress of the reactions occurring in the reaction plate. The resulting time series of spectra can then be mathematically deconvoluted to produce an individual response for each reaction.

In some embodiments, the sensing circuit includes a sensor component having a number of sensor elements distributed among regions of area of interest. A resonant characteristic of the sensing circuit may be modified by an external event affecting a sensor element associated with a region. For example, the resonant characteristic may be modified by exposure of the sensing element to an environmental parameter such as light, moisture, pressure, gas, temperature, and/or other environmental parameters. In some embodiments, the sensing elements could be exposed differentially to optical parameters, such as different frequencies or amounts of optical radiation, such as by the use of, but not limited to light filters. In some embodiments, the resonant characteristic of the resonant circuit may be modified by disconnecting a sensor element from the resonant circuit or by short circuiting a sensor element.

Figure 7:
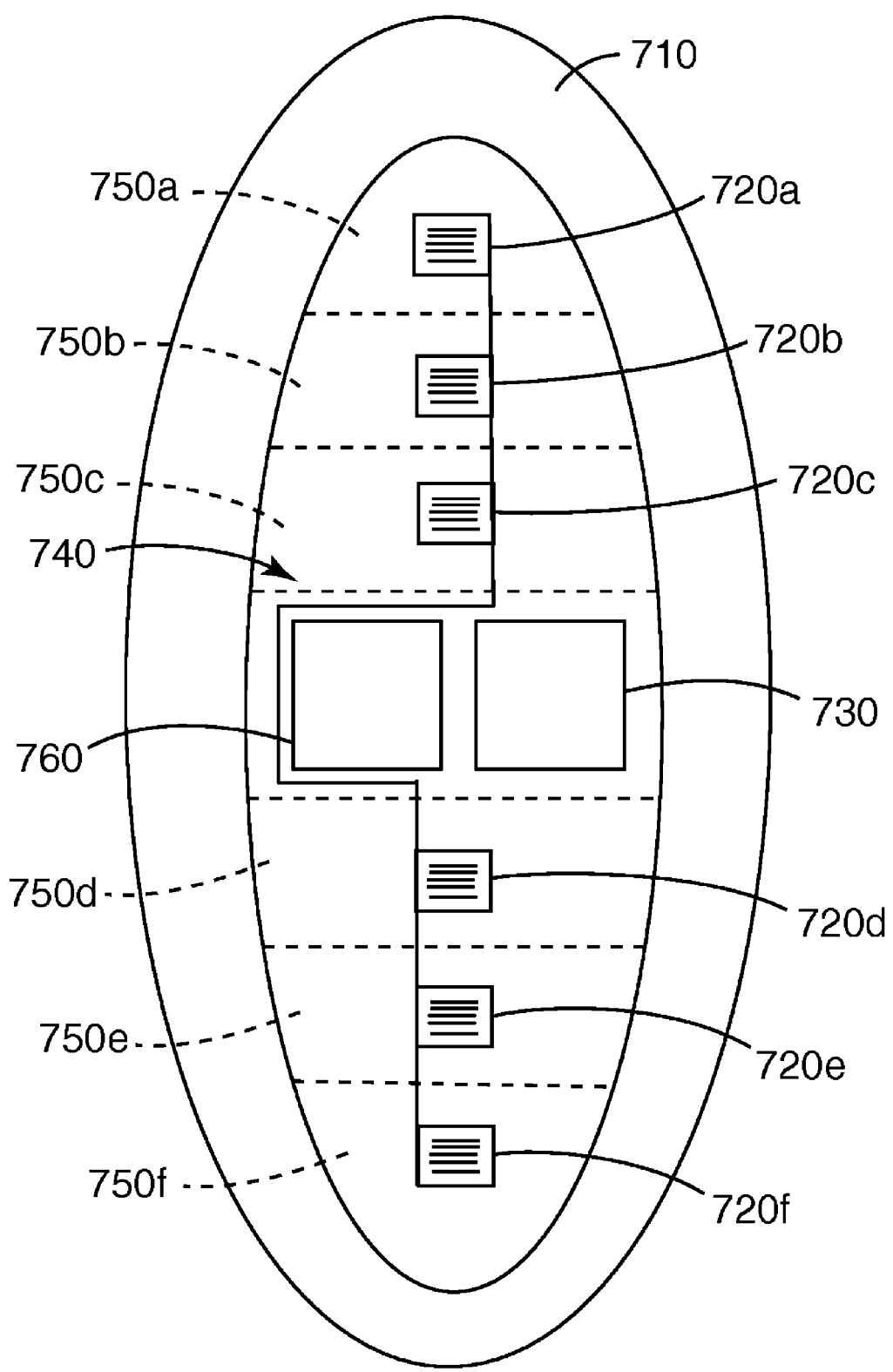
FIG. 7 depicts a wound dressing having a moisture sensing circuit in accordance with embodiments of the invention.

One implementation of a sensing circuit 740 incorporating distributed moisture sensor elements 720a-720f is illustrated in the diagram of FIG. 7. In this example, the area of interest involves the area of a wound dressing 710 and the moisture sensing circuit 740 includes a capacitive sensor having a number of capacitive sensor elements 720a-720f distributed in distinct regions 750a-750f of the wound dressing. The capacitive elements 720a-720f may be configured as interdigitated capacitive sensors as described herein which are connected in series or in parallel. In this example, the capacitive sensor elements 720a-720f are affected by an external event, i.e., the presence of moisture.

A large area wound such as a burn requires special attention in controlling the moisture build up in the dressing 710. The dressing 710 needs to be kept on the wound long enough to stabilize healing but not too long such that moisture/wetness of the dressing 710 becomes excessive. Early removal of the dressing 710 could delay healing by unnecessary handling of the healing zone. Additionally, the cost of repeated checks and changes of such a dressing 710 can be costly and it is desirable to know when the dressing 710 is not needed. A non-contact, non-invasive method for gauging wetness of a dressing 710 enables efficient, timely, and cost effective wound care.

The sensor elements 720a-720f of the sensing circuit 740 may be distributed among regions 750a-750f of the wound dressing 710, and may be disposed on or embedded in the wound dressing 710. The sensing circuit also includes an inductor 760. In some configurations, a reference circuit 730 is also used.

The distributed capacitive sensor elements 720a-720f may be used to provide an indication of the state of wetness of the dressing. The interdigitated electrodes of the capacitive elements 720a-720f may be disposed on or embedded in a moisture sensitive material. Moisture absorption by the material changes the dielectric constant of the material. As each sensor element 720a-720f is affected by moisture, the capacitance of the affected element is modified, altering the resonant frequency of the sensing circuit 740. An interrogator having a resonance analyzer may be used to detect changes in resonant frequency of the sensing circuit 740 corresponding to moisture in the dressing 710. For example, the moisture in the dressing may first be present in region 750a, affecting sensor element 720a, causing a first change in the resonant frequency of the sensing circuit 740. After a period of time, the moisture may be present in region 750b, affecting element 720b, causing a second change in resonant frequency of the resonant circuit 740. The changes in the resonant frequency corresponding to the wetness of the dressing 710 in the regions 750a-750f may be tracked over time to determine an appropriate time for changing the wound dressing.

A reference circuit signal may be used to adjust for measurement-to-measurement variation of the sensing circuit signal due to changes in distance and/or orientation of the sensing circuit relative to the interrogator and/or other parameters affecting inductive coupling between the sensing circuit 740 and the interrogator. A reference circuit 730 may include a resonant circuit having a resonant frequency distinct from resonance frequency range of the sensing circuit 740. The reference circuit 730 may be encapsulated or hermetically sealed to prevent resonance drift due to exposure to moisture and/or other environmental conditions. In some configurations, the reference circuit 730 may include circuitry to allow data storage. For example, the data stored may be related to one or more previous interrogations of the sensing circuit, or may include information on initial conditions of the sensing circuit.

Figure 8A:
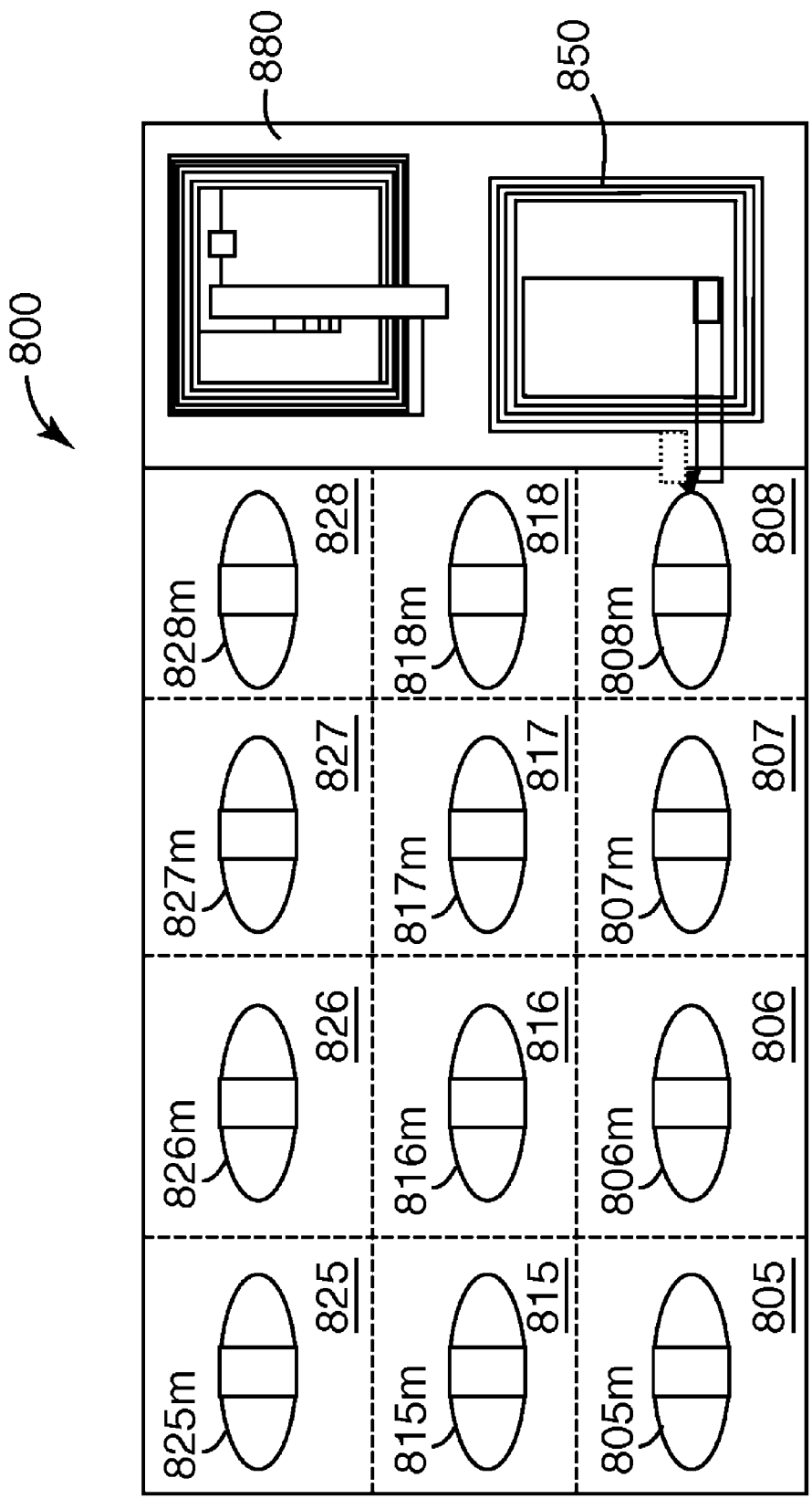
FIGS. 8A and 8B illustrate top and bottom views of an exemplary object dispenser having a sensing circuit in accordance with embodiments of the invention.
Figure 8B:
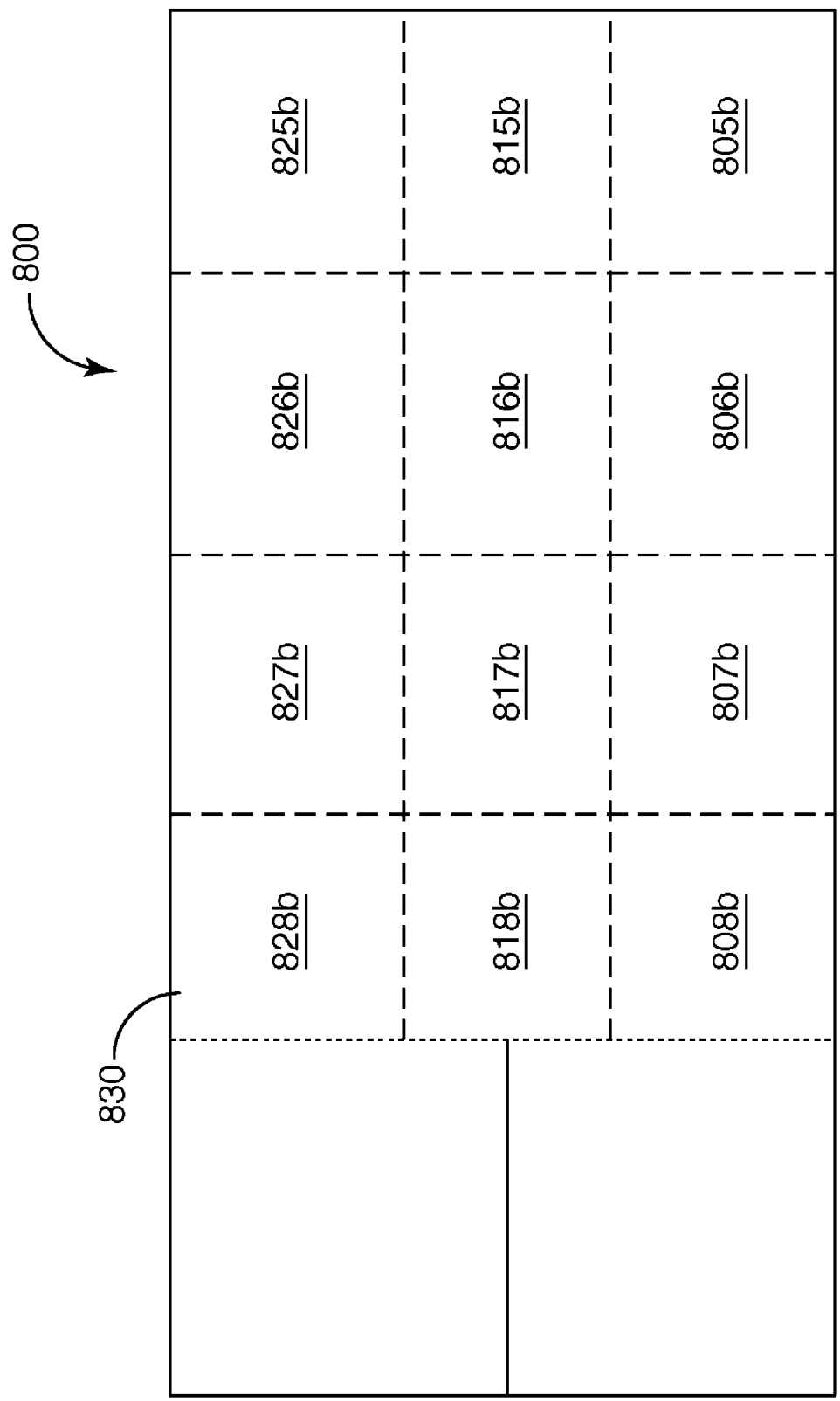

Another implementation of remote sensing using a distributed sensor involves an object dispenser. Top and bottom views of an exemplary object dispenser are illustrated in FIGS. 8A and 8B, respectively. A cross section of the object dispenser 800 is depicted in FIG. 8C. In this example, the object dispenser 800 is a blister pack for dispensing medication such as pills. The blister pack 800 includes a backing 830 having multiple layers, including first and second foil layers 831, 832 separated by a dielectric 833. The foil layers 831, 832 and dielectric 833 form a capacitor, having a capacitive element associated with each medication container 805-808, 815-818, 825-828. The circuit model for capacitive elements 805c-808c associated with medication containers 805-808 is illustrated in FIG. 8D. Capacitive elements 805c-808c are connected in parallel with an inductor 850 forming a resonant circuit 890.

In one example, the medication 805m-808m, 815m-818m, 825m-828m in the medication containers 805-808, 815-818, 825-828 are accessed according to a time schedule, such as one pill per day. As each dose of medication 805m-808m, 815m-818m, 825m-828m is accessed, the backing 830 in the region of the medication container 805-808, 815-818, 825-828 holding the accessed dose is removed. Perforations 840 may be provided for convenient removal of the backing 830 in the region of the accessed medication container 805-808, 815-818, 825-828 while the backing 830 in other regions remains intact. Removal of the backing 830 of a medication container 805-808, 815-818, 825-828 removes and disconnects the capacitive element associated with the medication container 805-808, 815-818, 825-828 from the resonant circuit. Disconnection of each capacitive element incrementally changes capacitance value of the resonant circuit 890 which shifts the resonance characteristic of the resonant circuit 890. Shifts in the resonance characteristic can be detected by a remote interrogator (not shown). The interrogator be incorporated in a storage container for multiple blister packs having different characteristic frequencies. Based on the detected resonance characteristic of the resonant circuit 890, the interrogator may interpret the number of medication dosages 805m-808m, 815m-818m, 825m-828m dispensed. By tracking the removal of the medication 805m-808m, 815m-818m, 825m-828m over a period of time, the interrogator may determine an approximate time the pills were dispensed (and presumably taken by the patient).

In some embodiments, the blister pack 800 may additionally include a reference circuit 880, which may be used to normalize or adjust the signal produced by the resonant circuit 890 to account for distance and/or orientation relative to the remote interrogator. The reference circuit 880 may also provide data storage capabilities. For example, the time and/or number of medication dosages dispensed may be stored after each interrogation of the blister pack 800. In one implementation, the data stored in the reference circuit 880 may be updated by the interrogator after each interrogation that indicates medication was dispensed and could report the times to the hospital. The interrogator could also include functionality to alert the patient or hospital that a dose has been missed.

Figure 8E:
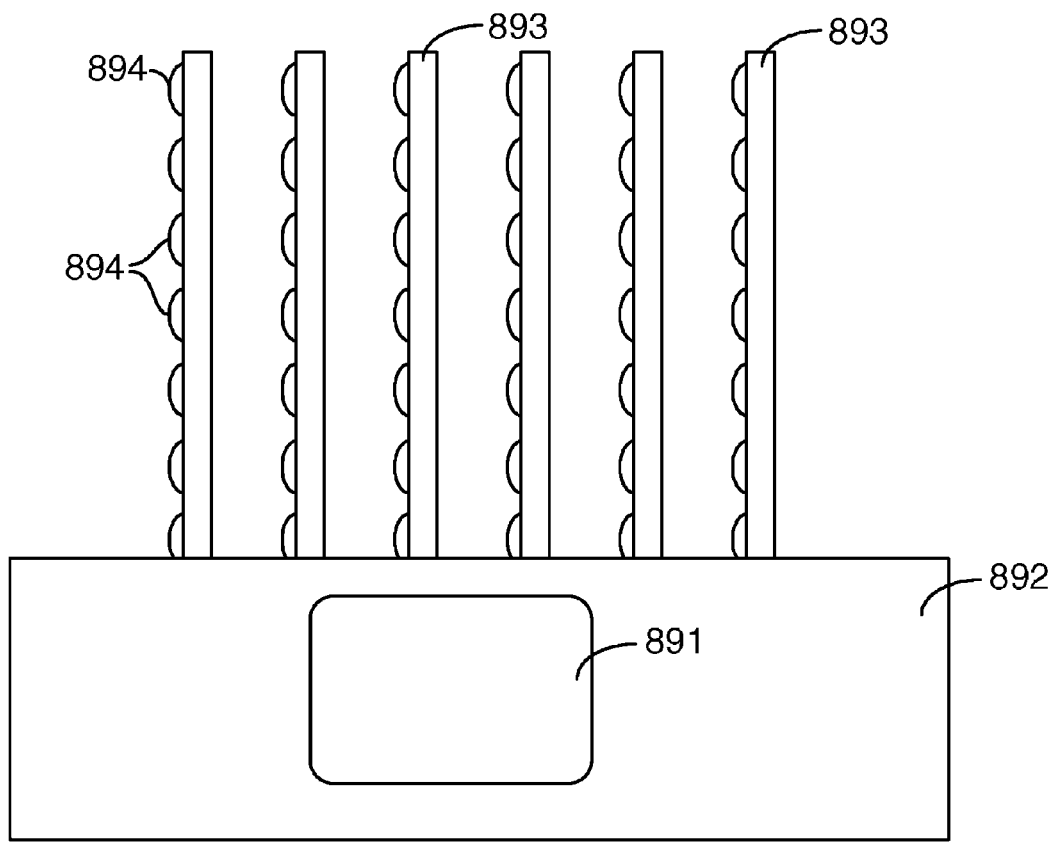
FIG. 8E illustrates an interrogator incorporated in a blister pack dispenser for tracking blister packs or items contained in the blister packs in accordance with embodiments of the invention.

In some implementations, the interrogator may be configured to interrogate a number of remote sensing devices. For example, as illustrated in FIG. 8E, an interrogator 891 may be disposed in or on a blister pack dispenser 892 arranged to hold multiple blister packs 893. The interrogator 891 can detect the presence or absence of each of the blister packs 893 in the dispenser 892, and can also detect the usage of pills or other items accessed from each blister pack container 894.

Figure 9D:
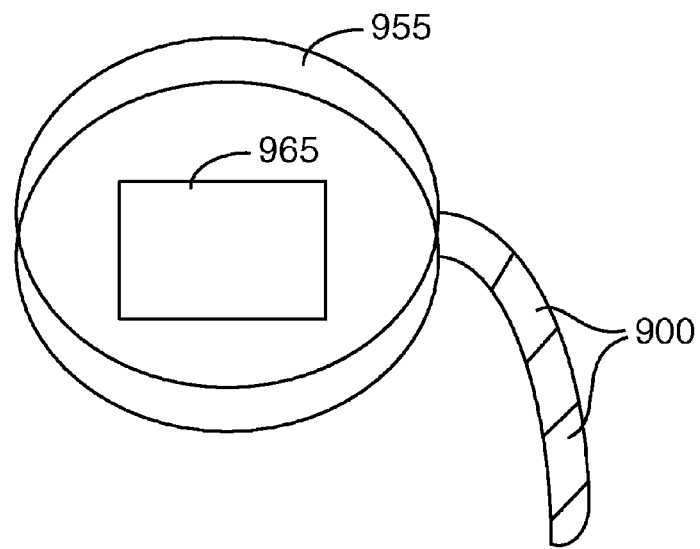
FIG. 9D illustrates an interrogator incorporated in a ticket dispenser for tracking tickets as they are removed from the dispenser in accordance with embodiments of the invention.
Figure 9A:
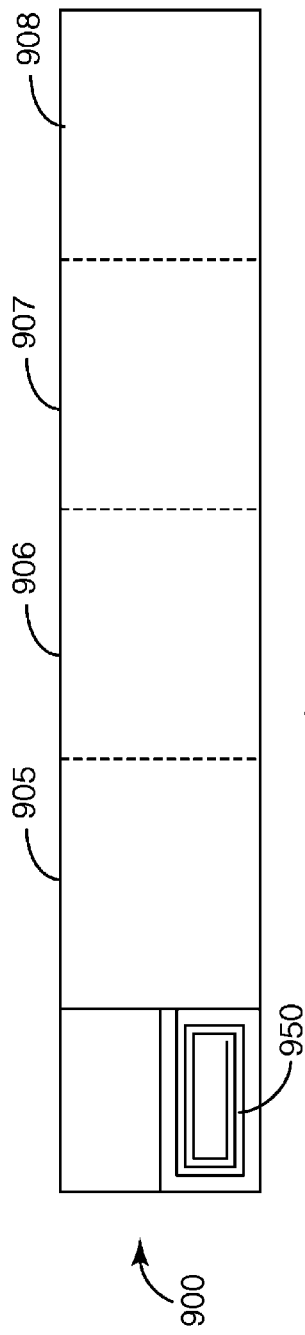
FIGS. 9A and 9B illustrate plan and cross section views, respectively of a ticket object including a sensor circuit in accordance with embodiments of the invention.
Figure 9B:
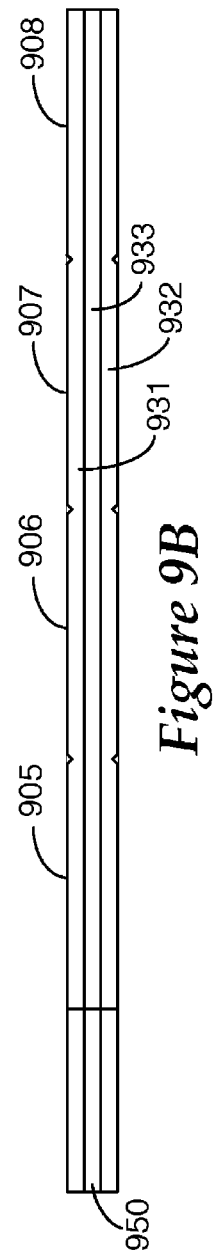
Figure 9C:
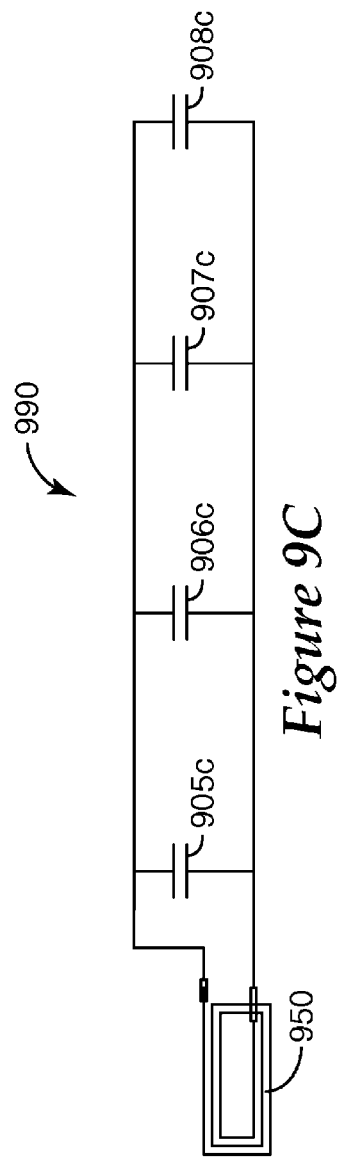
FIG. 9C illustrates a schematic diagram of the sensing circuit of the ticket object illustrated in FIGS. 9A and 9B.

Another example of a sensing circuit 990 having distributed sensors involves a ticket object 900 illustrated in plan view in FIG. 9A and cross section in FIG. 9B. A schematic diagram of the sensing circuit 990 is illustrated in FIG. 9C. The ticket object 900 includes multiple tickets 905-908 which occupy four distinct regions of the ticket object 900. Although four tickets 905-908 are depicted in FIGS. 9A-9C, any number of tickets may be included in the ticket object 900. Each ticket 905-908 is associated with a sensor element, such as a capacitor sensor element 905c-908c.

In one implementation, the ticket object 900 is a multilayer structure having two foil layers 931, 932 separated by a dielectric adhesive 933. The foil layers 931, 932 are coupled to an inductor 950 forming a resonant circuit 990. As each ticket 905-908 is used, the capacitor element 905c-908c associated with the ticket 905-908 is removed, disconnected, short circuited, or otherwise altered, incrementally changing the resonant frequency of the resonant circuit 990. The number of tickets 905-908 removed or remaining may be determined by a remote interrogator. In some configurations implementation, illustrated in FIG. 9D, the dispenser 955 holding the ticket objects 900 may incorporate the interrogator circuitry 965. The example illustrated in FIG. 9D illustrates tickets 900 arranged in a roll residing in a dispenser 955 that also contains the interrogator circuitry 965, enabling tracking of the tickets 900 as they are removed from the dispenser.

In some implementations, the ticket object 900 may include a reference circuit (not shown) for normalizing the signal produced by the resonant circuit 990 with respect to angle and distance from the interrogator. As previously discussed, the reference circuit may have the capability to store data, such as information regarding the use of the ticket object 900, including the identification of the ticket object 900 and/or authorized user(s) of the ticket object, date, time, and/or location of use of the tickets 905-907, and/or other data associated with the ticket object 900.

Figure 10:
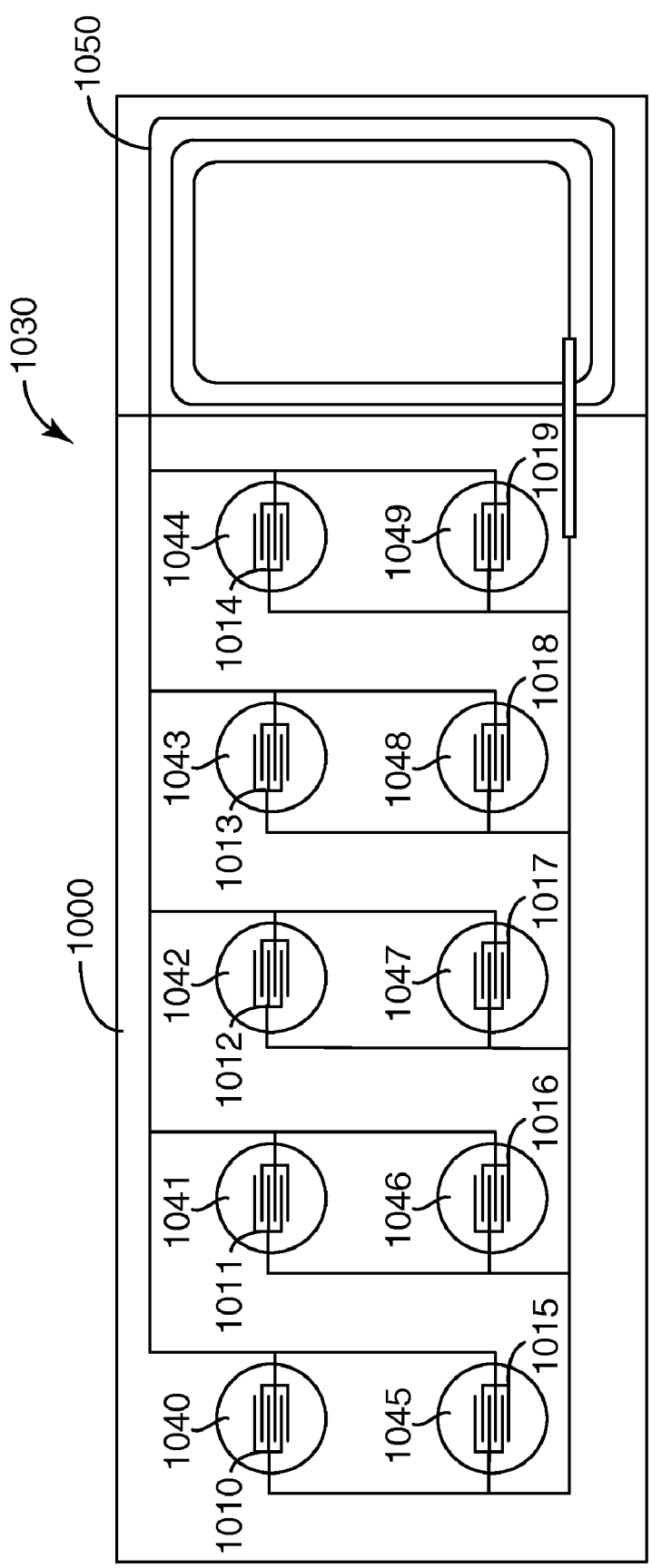
FIG. 10 illustrates a reaction plate having a remote sensing circuit in accordance with embodiments of the invention.

FIG. 10 illustrates another example of remote sensing using a distributed sensor. In this example, each reaction well 1040-1049 of a reaction plate 1000 includes a sensor element, such as an interdigitated capacitor 1010-1019. The sensor elements 1010-1019 are coupled to an inductor 1050 forming a resonant circuit 1030. In this configuration the sensors 1010-1019 are not individually accessible. As the chemical reaction progresses in each well 1040-1049, a resonant characteristic of the resonant circuit 1030 changes. The shift in the resonant characteristic indicates the global progress of all of reactions occurring in the reaction plate 1000.

In some applications, the remotely accessible sensing circuit of the present invention may be used in conjunction with a gauge to provide an electronic indication of the status of a condition or process. In some configurations, the gauge may provide a visual indication along with the electronic indication provided by the sensing circuit.

Figure 11A:
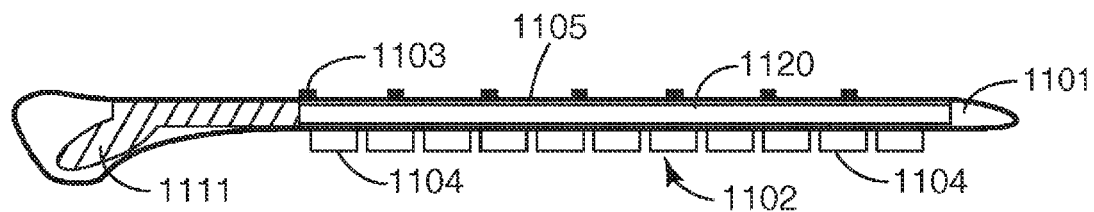
FIGS. 11A-11B illustrate a sterilization gauge and a distributed sensor in accordance with embodiments of the invention.
Figure 11B:
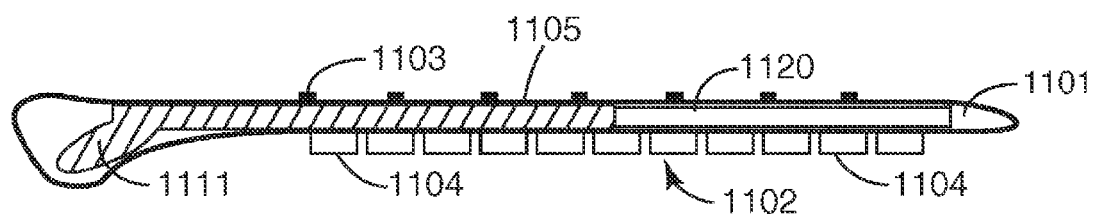

FIGS. 11A-11B illustrate a gauge that may be used in conjunction with a remotely accessible sensing circuit. Operation of the gauge and remote sensing circuit is described in connection with a sterilization process, although the concept is applicable in numerous other implementations.

Sterilization gauges are typically placed in difficult to access locations within a group of items to be sterilized to provide a "worst case" scenario for the sterilization process. This check could serve to validate the success of the sterilization process. If the gauge cannot be remotely accessed, it must be removed to check the progress of the sterilization process. Removing the gauge disrupts the sterilization cycle and can compromise the sterilized items.

The remote sensing approach of the present invention provides for detecting the progress of the sterilization process without removal of the gauge. The sensing circuit used in conjunction with the gauge may be used to remotely measure one or more variables associated with effective sterilization, such as time, temperature, steam, radiation, sterilant exposure, and/or other variables.

The gauge 1101 illustrated in FIGS. 11A-11B may be used to in conjunction with a sensor 1102 to form a remotely accessible sterilization gauge that integrates both time and temperature to provide the status of the sterilization process.

A gauge material, 1111, e.g., salicylamide, that melts at a temperature below the steam temperature is placed in fluid contact with an elongated wick 1120, such as a paper wick. After the gauge material 1111 reaches its melting point, it migrates along the wick 1120 as a function of time in the sterilization environment. The progression of the gauge material 1111 along the wick 1120 may provide a visual indication of the status of the sterilization process, for example.

The gauge 1101 may include scale markers 1103 along the wick 1120 that indicate divisions of the gauge area into a number of regions 1105. The regions are calibrated to correspond to an amount of exposure to a sterilization parameter. The gauge 1101 and wick 1120 are disposed on a sensor 1102 having sensor elements that are arranged in relation to the calibrated gauge regions. For example, in one embodiment, the sensor 1102 may comprise an interdigitated capacitive sensor having electrodes 1104 that are arranged in relation to the regions of the gauge 1101. The sensor is a component of a resonant circuit that provides for remote access of the status of the sterilization process.

Figure 11C:
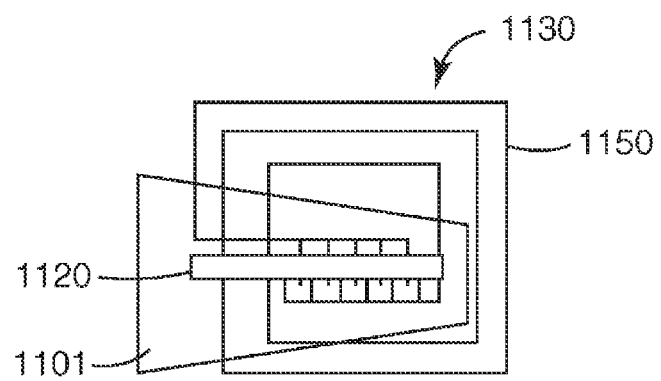
FIG. 11C is a top view of a sensing device including a gauge and sensing circuit in accordance with embodiments of the invention.
Figure 11D:
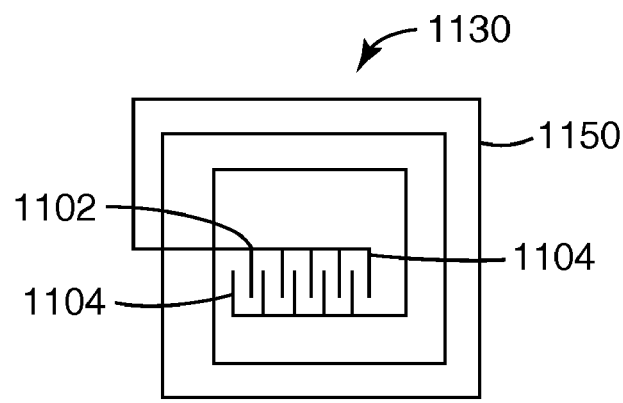
FIG. 11D illustrates the sensing circuit of FIG. 11C without the gauge.

FIGS. 11A and 11B provide side views of the gauge 1101 and sensor 1102 showing the migration of the gauge material 1111 along the wick 1120 at different times in the sterilization environment. FIG. 11C is a top view of the gauge 1101 including the wick 1120 and the remote sensing circuit 1130. FIG. 11D illustrates the sensing circuit 1130 without the gauge 1101. The interdigitated electrodes 1104 of the capacitive sensor 1102 are coupled with an inductor 1150 to form a resonant circuit 1130 having a characteristic resonant frequency.

Migration of the gauge material 1111 along the wick 1120 causes the gauge material 1111 to flow along the interdigitated electrodes 1104, producing a change in the dielectric constant of the capacitive sensor 1102 of the resonant circuit 1130. A change in the dielectric constant changes the capacitance value of the capacitive sensor 1102 causing a corresponding shift in the resonant frequency of the resonant circuit 1130. The amount of shift in the resonant frequency is related to the distance the gauge material 1111 has traveled along the wick 1120. As the gauge material 1111 flows to additional regions of the gauge, the resonant frequency of the sensing circuit 1130 changes. The sensing circuit 1130 can be remotely interrogated and the resonant frequency analyzed to determine the progress of the sterilization process. A particular resonant frequency may indicate a transitional point where the gauge material travels along the wick 1120 to a sufficient number of regions to produce a "pass" condition indicating that the sterilization process has met established criteria.

Remote sensing allows the status of the sterilization gauge to be determined from outside the sterilization pack. The sensing circuit can be interrogated after the sterilization cycle and sterilization data may be automatically saved, without the need for manual data entry. Furthermore, the remote access sterilization gauge may be read in real time while the sterilization process is underway. Real time access provides for shortened sterilization cycles because the items may be removed based on the gauge data rather than a predetermined "worst case" sterilization time.

Figure 12:
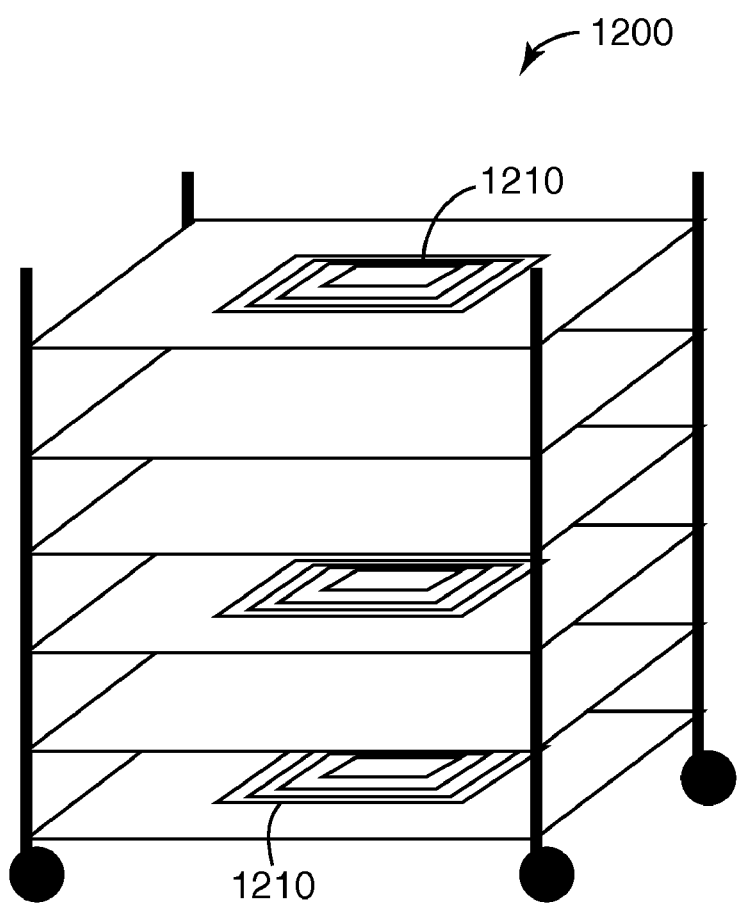
FIG. 12 illustrates a sterilization cart that may be used in conjunction with a remote access sterilization gauge in accordance with embodiments of the invention.

FIG. 12 illustrates a sterilization cart 1200 that may be used in conjunction with the remote access sterilization gauge described above. The sterilization cart 1200 includes one or more reading antennas 1210 that may be used to interrogate the remote access gauges. Each gauge may be selected to operate at a different frequency range so that the gauges used can be uniquely accessed. The signals in the reading antennas 1210 may be relayed outside the sterilization chamber for real-time data access. This relay process may be accomplished by a wired or wireless reader.

In one implementation the cart 1200 and gauges may be used to test the effectiveness of the sterilization chamber. The gauges may be placed in process challenge devices designed to test the efficacy of the sterilization chamber at locations where the sterilizing gas has difficulty accessing the items. The process challenge devices may be placed at various locations within the sterilization chamber. The sterilization cart 1200 with reading antennas 1210 provides for real time data acquisition during a sterilization cycle allowing the sterilization characteristics of the chamber to be mapped and documented. The sterilization test may be used to troubleshoot the chamber and/or to show compliance with regulations or process guidelines, for example.

The approaches of the present invention provide cost effective solutions for remote sensing with wide applicability. Many circuit configurations may be used to accomplish remote sensing as described herein. The invention is not limited to the specific embodiments, configurations, or implementations used to explain the concepts of the invention. For example, the sensing circuit may include various components that are sensitive to an external event and which may be used as the sensing component(s) of the sensing circuit. For example, the sensing component may comprise one or more resistors, capacitors, inductors, and/or various combinations of these components.

The foregoing description of the various embodiments of the invention has been presented for the purposes of illustration and description. It is not intended to be exhaustive or to limit the invention to the precise form disclosed. Many modifications and variations are possible in light of the above teaching. For example, embodiments of the present invention may be implemented in a wide variety of applications. It is intended that the scope of the invention be limited not by this detailed description, but rather by the claims appended hereto.

What is claimed is:

1. A remote sensing system, comprising:
a device comprising a plurality of components including at least an inductor and a capacitor arranged to form a sensing circuit having a resonant characteristic, at least one component of the plurality of components comprising elements respectively associated with regions of an area of interest, the elements arranged so that a resonant characteristic of the sensing circuit is modifiable by an external event affecting an element associated with a region; and
an interrogator configured to detect the resonant characteristic, wherein the regions comprise ticket objects and the interrogator is disposed in a dispenser of the ticket objects.

2. A remote sensing system, comprising:
a device comprising a plurality of components including at least an inductor and a capacitor arranged to form a sensing circuit having a resonant characteristic, at least one component of the plurality of components comprising elements respectively associated with regions of an area of interest, the elements arranged so that a resonant characteristic of the sensing circuit is modifiable by an external event affecting an element associated with a region; and
an interrogator configured to detect the resonant characteristic, wherein the regions comprise accessible sections of a blister pack and the interrogator is disposed in a blister pack dispenser.

* * * * *

UNITED STATES PATENT AND TRADEMARK OFFICE
CERTIFICATE OF CORRECTION

| | | |
|---|---|---|
| PATENT NO. | : 7,948,380 B2 | Page 1 of 1 |
| APPLICATION NO. | : 11/383652 | |
| DATED | : May 24, 2011 | |
| INVENTOR(S) | : David W Kuhns et al. | |

It is certified that error appears in the above-identified patent and that said Letters Patent is hereby corrected as shown below:

<u>Page 2</u>,
Column 2, (Other Publications), Line 8, Delete "hyrdogels" and insert -- hydrogels --, therefor.

<u>Column 4</u>,
Line 8, Delete "." and insert -- ; --, therefor.

<u>Column 9</u>,
Line 9, Delete "t1" and insert -- $t_1$ --, therefor.

Line 9, Delete "m1." and insert -- $m_1$. --, therefor.

Line 10, Delete "t2" and insert -- $t_2$ --, therefor.

Line 11, Delete "m2" and insert -- $m_2$ --, therefor.

Signed and Sealed this
Sixteenth Day of August, 2011

David J. Kappos
*Director of the United States Patent and Trademark Office*